US012793379B2

(12) United States Patent
Taira et al.

(10) Patent No.: US 12,793,379 B2
(45) Date of Patent: Nov. 10, 2026

(54) INFORMATION PROCESSING APPARATUS, INFORMATION PROCESSING METHOD, AND INFORMATION PROCESSING PROGRAM

(71) Applicant: FUJIFILM Corporation, Tokyo (JP)

(72) Inventors: Mitsutoshi Taira, Tokyo (JP); Makoto Yonaha, Tokyo (JP); Eiichi Tanaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 218 days.

(21) Appl. No.: 18/769,951

(22) Filed: Jul. 11, 2024

(65) Prior Publication Data

US 2024/0362888 A1 Oct. 31, 2024

Related U.S. Application Data

(63) Continuation of application No. PCT/JP2022/045978, filed on Dec. 14, 2022.

(30) Foreign Application Priority Data

Jan. 14, 2022 (JP) ................................ 2022-004404

(51) Int. Cl.
*G06V 10/44* (2022.01)
*G06T 7/50* (2017.01)
(Continued)

(52) U.S. Cl.
CPC ................ *G06V 10/44* (2022.01); *G06T 7/50* (2017.01); *G06T 7/62* (2017.01); *G06V 10/764* (2022.01);
(Continued)

(58) Field of Classification Search
CPC ........ G06V 10/44; G06V 10/764; G06T 7/50; G06T 7/62; G06T 2207/10116;
(Continued)

(56) References Cited

U.S. PATENT DOCUMENTS

2002/0114506 A1 8/2002 Hiroi et al.
2019/0170659 A1* 6/2019 Kaneko ................. G01N 23/18
(Continued)

FOREIGN PATENT DOCUMENTS

JP 4250898 B2 4/2009
WO 2018/034057 A1 2/2018
(Continued)

OTHER PUBLICATIONS

International Search Report issued in PCT/JP2022/045978; mailed Feb. 21, 2023.
(Continued)

*Primary Examiner* — Stephen R Koziol
*Assistant Examiner* — Samuel D Baynes
(74) *Attorney, Agent, or Firm* — Studebaker Brackett PLLC

(57) ABSTRACT

One embodiment of the present invention provides an information processing apparatus, an information processing method, and an information processing program capable of recording useful discontinuity information of a subject. According to one aspect of the present invention, there is provided an information processing apparatus including: a processor, in which the processor is configured to: acquire first discontinuity information obtained by analyzing an image of a subject with a first criterion, the first discontinuity information including information indicating a feature of a discontinuity; acquire second discontinuity information obtained by analyzing the image of the subject with a second criterion that is stricter than the first criterion, the second discontinuity information including information indicating the feature of the discontinuity; and record the second discontinuity information in association with the first discontinuity information.

23 Claims, 16 Drawing Sheets

(51) Int. Cl.
*G06T 7/62* (2017.01)
*G06V 10/764* (2022.01)
*G06T 7/00* (2017.01)

(52) U.S. Cl.
CPC ...... *G01N 2223/646* (2013.01); *G06T 7/0004* (2013.01)

(58) Field of Classification Search
CPC . G06T 2207/20081; G06T 2207/20084; G06T 7/0004; G01N 2223/646; G01N 2223/652; G01N 23/04
See application file for complete search history.

(56) References Cited

U.S. PATENT DOCUMENTS

| | | | | |
|---|---|---|---|---|
| 2019/0272630 | A1* | 9/2019 | Inazumi | G06T 7/0008 |
| 2021/0004948 | A1* | 1/2021 | Zass | G06Q 10/06316 |
| 2021/0072165 | A1* | 3/2021 | Kaneko | G01N 23/04 |
| 2021/0272654 | A1* | 9/2021 | Thaker | G01N 15/1433 |
| 2023/0082753 | A1 | 3/2023 | Kasamatsu et al. | |

FOREIGN PATENT DOCUMENTS

| | | | |
|---|---|---|---|
| WO | 2020/003917 | A1 | 1/2020 |
| WO | 2021/241535 | A1 | 12/2021 |

OTHER PUBLICATIONS

International Preliminary Report on Patentability (Chapter I) and Written Opinion of the International Searching Authority issued in PCT/JP2022/045978; issued Jun. 20, 2024.

Fioravanti, C et al.; "A Deep Artificial Immune System to Detect Weld Defects in DWDI Radiographic Images of Petroleum Pipes"; IEEE Access; Dec. 16, 2019; pp. 180947-180964; vol. 7; XP011761723; DOI: 10.1109/ACCESS.2019.2959810.

Boaretto, N & Centeno, T.; "Automated detection of welding defects in pipelines from radiographic images DWDI"; NDT&E International; Nov. 14, 2016; pp. 7-13; vol. 86; Elsevier; XP029893711; ISSN: 0963-8695; DOI: 10.1016/J.NDTEINT.2016.11.003.

Extended European Search Report issued in EP 22 92 0548.9-1218 by the European Patent Office on Apr. 14, 2025, which is related to U.S. Appl. No. 18/769,951.

* cited by examiner

FIG. 9

| ID | DISCONTINUITY TYPE | MAJOR AXIS [mm] | POSITION x | POSITION y | DEFECT/ NON-DEFECT |
|---|---|---|---|---|---|
| 1 | Porosity | 1.2 | x1 | y1 | NON-DEFECT |
| 2 | Porosity | 0.8 | x2 | y2 | NON-DEFECT |
| 3 | Porosity | 0.7 | x3 | y3 | NON-DEFECT |
| 4 | Porosity | 1.3 | x4 | y4 | NON-DEFECT |
| 5 | GasHole | 3.5 | x5 | y5 | NON-DEFECT |
| 6 | GasHole | 1.4 | x6 | y6 | NON-DEFECT |
| 7 | FMMD | 3.7 | x7 | y7 | NON-DEFECT |
| 8 | GasHole | 1.3 | x8 | y8 | NON-DEFECT |
| 9 | FMMD | 1.1 | x9 | y9 | NON-DEFECT |
| 10 | GasHole | 4.2 | x10 | y10 | DEFECT |
| ⋮ | | | | | |
| 1055 | Porosity | 0.7 | x1055 | y1055 | NON-DEFECT |
| 1056 | GasHole | 2.6 | x1056 | y1056 | NON-DEFECT |
| 1057 | GasHole | 1.9 | x1057 | y1057 | NON-DEFECT |

FIG. 10

| ID | DISCONTINUITY TYPE | MAJOR AXIS [mm] | POSITION x | POSITION y | DEFECT/ NON-DEFECT | DISCONTINUITY TO BE FOCUSED ON |
|---|---|---|---|---|---|---|
| 1 | Porosity | 1.2 | x1 | y1 | NON-DEFECT | |
| 2 | Porosity | 0.8 | x2 | y2 | NON-DEFECT | |
| 3 | Porosity | 0.7 | x3 | y3 | NON-DEFECT | |
| 4 | Porosity | 1.3 | x4 | y4 | NON-DEFECT | |
| 5 | GasHole | 3.5 | x5 | y5 | NON-DEFECT | YES |
| 6 | GasHole | 1.4 | x6 | y6 | NON-DEFECT | |
| 7 | FMMD | 3.7 | x7 | y7 | NON-DEFECT | YES |
| 8 | GasHole | 1.3 | x8 | y8 | NON-DEFECT | |
| 9 | FMMD | 1.1 | x9 | y9 | NON-DEFECT | |
| 10 | GasHole | 4.2 | x10 | y10 | DEFECT | YES |
| ⋮ | | | | | | |
| 1055 | Porosity | 0.7 | x1055 | y1055 | NON-DEFECT | |
| 1056 | GasHole | 2.6 | x1056 | y1056 | NON-DEFECT | YES |
| 1057 | GasHole | 1.9 | x1057 | y1057 | NON-DEFECT | YES |

INFORMATION PROCESSING APPARATUS, INFORMATION PROCESSING METHOD, AND INFORMATION PROCESSING PROGRAM

CROSS-REFERENCE TO RELATED APPLICATIONS

The present application is a Continuation of PCT International Application No. PCT/JP2022/045978 filed on Dec. 14, 2022 claiming priority under 35 U.S.C § 119 (a) to Japanese Patent Application No. 2022-004404 filed on Jan. 14, 2022. Each of the above applications is hereby expressly incorporated by reference, in its entirety, into the present application.

BACKGROUND OF THE INVENTION

1. Field of the Invention

The present invention relates to an information processing apparatus, an information processing method, and an information processing program for processing discontinuity information of a subject.

2. Description of the Related Art

In various technical fields, an inspector visually determines discontinuities or defects of a subject, and in a case where defects are found, the subject is classified as a defective product. In such an inspection, an image of the subject may be used. In addition, a technique of acquiring defect information or discontinuity information from the image of the subject through an image processing apparatus or the like is also known. For example, JP4250898B describes extracting a defect candidate from an image by using first and second threshold values.

SUMMARY OF THE INVENTION

However, it is burdensome for the inspector to individually determine defects or discontinuities, and simply extracting defects as in JP4250898B makes it difficult to utilize or analyze information on discontinuities that do not meet the criteria for defects, resulting in low utility of the extracted information.

The present invention has been made in view of such circumstances, and an object of the present invention is to provide an information processing apparatus, an information processing method, and an information processing program capable of recording useful discontinuity information of a subject.

In order to achieve the above-described object, according to a first aspect of the present invention, there is provided an information processing apparatus comprising: a processor, in which the processor is configured to: acquire first discontinuity information obtained by analyzing an image of a subject with a first criterion, the first discontinuity information including information indicating a feature of a discontinuity; acquire second discontinuity information obtained by analyzing the image of the subject with a second criterion that is stricter than the first criterion, the second discontinuity information including information indicating the feature of the discontinuity; and record the second discontinuity information in association with the first discontinuity information.

According to the first aspect, since the second discontinuity information obtained by analyzing the image of the subject with the second criterion that is stricter than the first criterion is recorded in association with the first discontinuity information, not only the first discontinuity information but also the second discontinuity information is recorded, and a relationship between the first discontinuity information and the second discontinuity information can be understood. Such first and second discontinuity information can be utilized for the analysis, prediction, and the like of the discontinuity of the subject. As described above, according to the first aspect, it is possible to record useful discontinuity information of the subject.

The processor can record the first discontinuity information and the second discontinuity information on various recording devices (an optical magnetic recording device or a semiconductor recording device). Those recording devices may use non-transitory and tangible recording media.

In the first aspect and each of aspects to be described below, for example, a discontinuous portion in an inspection target object (subject) such as a product can be defined as a "discontinuity". In addition, among the "discontinuities", a discontinuity that exceeds a determination criterion defined in a standard, a specification, or the like, resulting in the product (subject) or the like being deemed defective in tests or inspections, can be defined as a "defect". In this case, the defect refers to a discontinuity that has been determined as a "defect" either by an interpreter or automatically among the detected "discontinuities". For example, a discontinuity having a predetermined major axis can be determined as a "defect".

According to a second aspect, in the information processing apparatus described in the first aspect, the first discontinuity information and the second discontinuity information each have information regarding an arrangement of a plurality of the subjects, and the processor is configured to associate the first discontinuity information and the second discontinuity information with each other based on the information regarding the arrangement. The "information regarding the arrangement" may be information based on which the order of the subjects can be determined.

According to a third aspect, in the information processing apparatus described in the second aspect, the information regarding the arrangement has a component related to time. The "component related to time" is, for example, a specific period, a manufacturing time, an inspection time, or an image capturing time, but is not limited thereto.

According to a fourth aspect, in the information processing apparatus described in the second or third aspect, the processor is configured to obtain a range of the first discontinuity information and/or the second discontinuity information to be recorded, based on the information regarding the arrangement.

According to a fifth aspect, in the information processing apparatus described in any one of the first to fourth aspects, the processor is configured to calculate a recording condition based on the first discontinuity information, and acquire and/or record the second discontinuity information based on the recording condition. In the fifth aspect, the processor can calculate a condition for at least one of a specific period, a manufacturing number, a lot number, an inspection time, an inspection number, or an image capturing time as the recording condition and can record the discontinuity information under the calculated recording condition.

According to a sixth aspect, in the information processing apparatus described in the fifth aspect, the processor is configured to associate the first discontinuity information and the second discontinuity information with each other based on the recording condition.

According to a seventh aspect, in the information processing apparatus described in any one of the first to sixth aspects, the image is a radiation transmission image. The radiation transmission image can be used for a non-destructive inspection of the subject.

According to an eighth aspect, in the information processing apparatus described in any one of the first to seventh aspects, the first criterion is a criterion for at least one of a type, a number, a position in the subject, a size, a shape, a presence density, or a distance from another discontinuity of the discontinuity, and the processor is configured to perform the recording by using information indicating at least one of the type, the number, the position in the subject, the size, the shape, the presence density, or the distance from the other discontinuity of the discontinuity as the feature of the discontinuity. The second aspect defines a specific aspect of the “first criterion” for the “discontinuity”. A value of the criterion may differ depending on a type of the discontinuity.

According to a ninth aspect, in the information processing apparatus described in any one of the first to eighth aspects, the second criterion is a criterion for at least one of a type, a number, a position in the subject, a size, a shape, a presence density, or a distance from another discontinuity of the discontinuity, and the processor is configured to perform the recording by using information indicating at least one of the type, the number, the position in the subject, the size, the shape, the presence density, or the distance from the other discontinuity of the discontinuity as the feature of the discontinuity. The third aspect defines a specific aspect of the “second criterion” for the “discontinuity”, and the value of the criterion may differ depending on the type of the discontinuity.

According to a tenth aspect, in the information processing apparatus described in any one of the first to ninth aspects, the processor is configured to acquire the second discontinuity information based on the second criterion for a discontinuity in the first discontinuity information and for a discontinuity that has a lower influence on quality and/or performance of the subject than the discontinuity in the first discontinuity information. The fourth aspect specifically defines that the “discontinuity” which is an acquisition target of the second discontinuity information is determined by the “second criterion that is stricter than the first criterion” defined in the first aspect.

According to an eleventh aspect, in the information processing apparatus described in any one of the first to tenth aspects, the first discontinuity information and the second discontinuity information include information related to an occurrence timing of the discontinuity, and the processor is configured to acquire at least one of a manufacturing time, a manufacturing number, a lot number, an inspection time, an inspection number, or an image capturing time of the subject as the information related to the occurrence timing of the discontinuity. As defined in the eleventh aspect, the “information related to the occurrence timing of the discontinuity” may be information acquired in time series, instead of the time itself.

According to a twelfth aspect, in the information processing apparatus described in any one of the first to eleventh aspects, the processor is configured to perform the recording for a predetermined region in the subject.

According to a thirteenth aspect, in the information processing apparatus described in any one of the first to twelfth aspects, the processor is configured to perform the recording for a period in which an occurrence frequency of the discontinuity is higher than a determination criterion value. Performing the recording for the period in which the occurrence frequency of the discontinuity is higher than the determination criterion value is one aspect of the recording according to the recording condition.

According to a fourteenth aspect, in the information processing apparatus described in any one of the first to twelfth aspects, the processor is configured to perform the recording for a period in which an occurrence frequency of the discontinuity is equal to or lower than a determination criterion value. Performing the recording for the period in which the occurrence frequency of the discontinuity is equal to or lower than the determination criterion value is one aspect of the recording according to the recording condition.

According to a fifteenth aspect, in the information processing apparatus described in any one of the first to twelfth aspects, the processor is configured to perform the recording for a period in which an occurrence frequency of the discontinuity falls within a determination criterion range. Performing the recording for the period in which the occurrence frequency of the discontinuity falls within the determination criterion range is one aspect of the recording according to the recording condition.

According to a sixteenth aspect, in the information processing apparatus described in any one of the first to fifteenth aspects, the processor is configured to perform the recording for a first period in which the first discontinuity information is present. Performing the recording for the first period in which the first discontinuity information is present is one aspect of the recording according to the recording condition.

According to a seventeenth aspect, in the information processing apparatus described in the sixteenth aspect, the processor is configured to perform the recording for the first period and a second period preceding the first period. Performing the recording for the first period and the second period preceding the first period is one aspect of the recording according to the recording condition.

According to an eighteenth aspect, in the information processing apparatus described in any one of the first to seventeenth aspects, an image analyzer that is constructed by using a machine learning algorithm and performs the analysis on the image of the subject is further provided, and the processor is configured to acquire the first discontinuity information and/or the second discontinuity information by using the image analyzer. The image analyzer can be constructed by, for example, a neural network.

According to a nineteenth aspect, in the information processing apparatus described in the eighteenth aspect, the image analyzer performs one or more of detection, classification, and measurement as the analysis, and the processor is configured to acquire the first discontinuity information and/or the second discontinuity information based on a result of the analysis.

According to a twentieth aspect, in the information processing apparatus described in the eighteenth or nineteenth aspect, the processor is configured to correct a result of the analysis according to an operation of a user. In some cases, the analysis result of the image analyzer may include an error, an inappropriate result, unnecessary information, or the like, but according to the twentieth aspect, the user can correct the analysis result and acquire appropriate information.

According to a twenty-first aspect, in the information processing apparatus described in any one of the first to twentieth aspects, the processor is configured to output the recorded information and/or information extracted from the recorded information to a recording device and/or a display device. The extracted information may be displayed by being associated with or superimposed on the image of the subject, a design drawing, or the like.

According to a twenty-second aspect, in the information processing apparatus described in the twenty-first aspect, the processor is configured to extract information from the recorded information under a condition designated by an operation of a user, and output the extracted information. According to the twenty-first aspect, the user can extract and refer to the information according to a desired condition.

In order to achieve the above-described object, according to a twenty-third aspect of the present invention, there is provided an information processing method executed by an information processing apparatus including a processor, the information processing method comprising: causing the processor to execute: a first information acquisition step of acquiring first discontinuity information obtained by analyzing an image of a subject with a first criterion, the first discontinuity information including information indicating a feature of a discontinuity; a second information acquisition step of acquiring second discontinuity information obtained by analyzing the image of the subject with a second criterion that is stricter than the first criterion, the second discontinuity information including information indicating the feature of the discontinuity; and a recording step of recording the second discontinuity information in association with the first discontinuity information.

According to the twenty-third aspect, useful discontinuity information of the subject can be recorded as in the first aspect. The information processing method according to the twenty-third aspect may have the same configurations as those of the second to twenty-second aspects.

In order to achieve the above-described object, according to a twenty-fourth aspect of the present invention, there is provided an information processing program for causing an information processing apparatus including a processor to execute an information processing method, the information processing program causing the processor to execute, using the information processing method: a first information acquisition step of acquiring first discontinuity information obtained by analyzing an image of a subject with a first criterion, the first discontinuity information including information indicating a feature of a discontinuity; a second information acquisition step of acquiring second discontinuity information obtained by analyzing the image of the subject with a second criterion that is stricter than the first criterion, the second discontinuity information including information indicating the feature of the discontinuity; and a recording step of recording the second discontinuity information in association with the first discontinuity information.

According to the twenty-fourth aspect, useful discontinuity information of the subject can be recorded as in the first and twenty-third aspects. The information processing program according to the twenty-fourth aspect may have the same configurations as those of the second to twenty-second aspects. In addition, a non-transitory and tangible recording medium having a computer-readable code of the information processing program of these aspects recorded thereon can also be employed as an aspect of the present invention.

As described above, with the information processing apparatus, the information processing method, and the information processing program of the aspects of the present invention, it is possible to record useful discontinuity information of the subject.

BRIEF DESCRIPTION OF THE DRAWINGS

FIG. 9 is a table showing an example of the discontinuity information in an inspection target object (subject).

FIG. 10 is a diagram showing another example of the discontinuity information.

DESCRIPTION OF THE PREFERRED EMBODIMENTS

First Embodiment

[Configuration of Inspection Apparatus]

Figure 1:
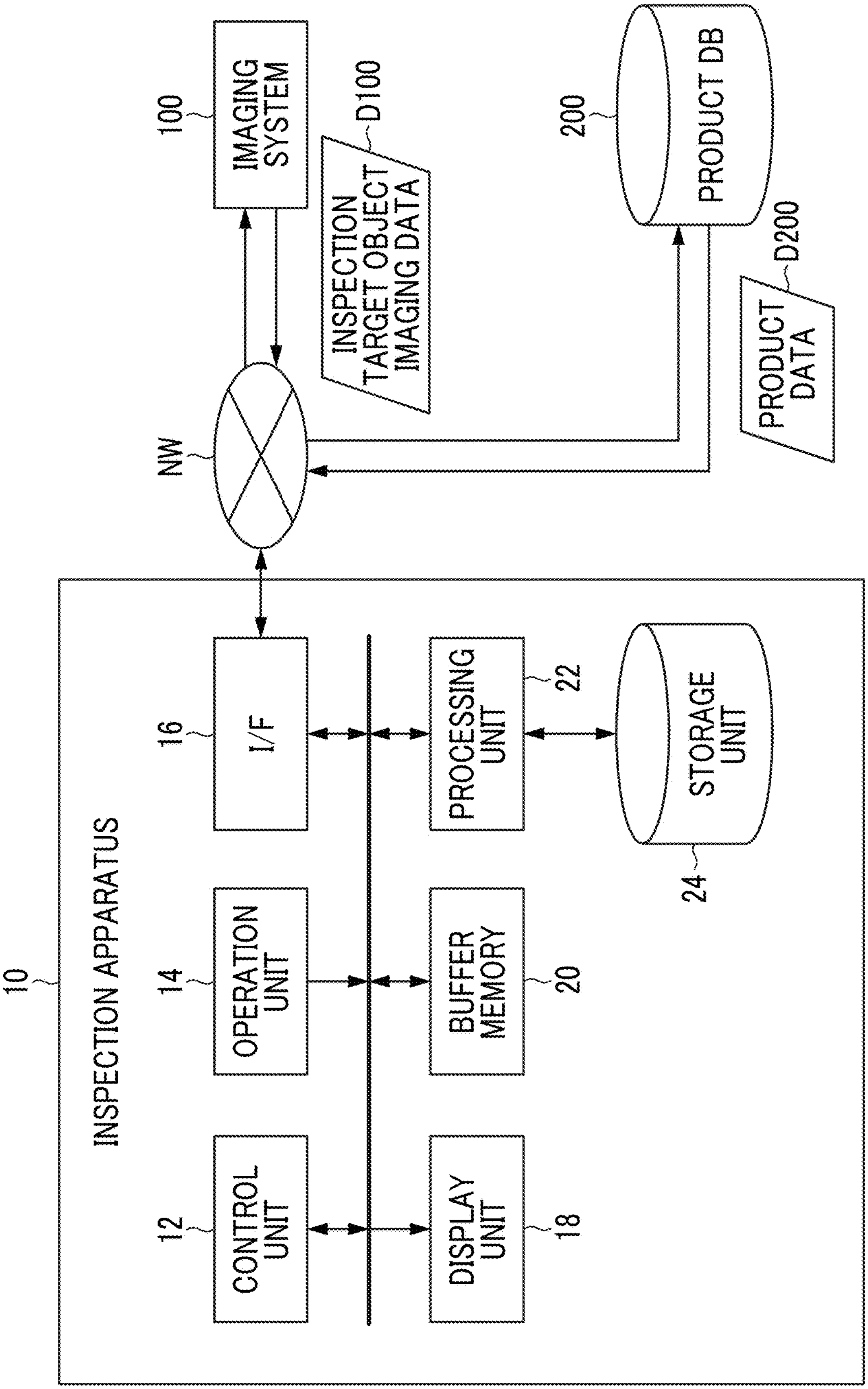
FIG. 1 is a block diagram showing a configuration of an inspection apparatus according to a first embodiment.

FIG. 1 is a block diagram showing an inspection apparatus 10 according to a first embodiment.

The inspection apparatus 10 (information processing apparatus) according to the present embodiment is an apparatus that acquires discontinuity information from an image obtained by imaging an inspection target (inspection target object, subject) and that recording and outputs (displays or the like) the acquired information with a designated condition, and is an apparatus for assisting an interpreter in diagnosing, analyzing, and the like a discontinuity of the inspection target object. Here, the "inspection target object" refers to an object to be inspected, and various articles are assumed. For example, in a case where the inspection apparatus 10 is used for industrial inspection, industrial parts or industrial products that require high precision in design and manufacturing can be assumed as the inspection target object (subject). However, the application range of the present invention is not limited to these inspection target objects (for other examples of the inspection target object, refer to the section of "Other Examples of Inspection Target Object (Subject)" to be described below).

In addition, a "light-reception image" is an image that is obtained by irradiating the inspection target object with radiation, visible light, infrared light, or the like and that is created based on transmitted light or reflected light of the inspection target object.

As shown in FIG. 1, the inspection apparatus 10 according to the present embodiment comprises a control unit 12, an operation unit 14, an I/F 16 (I/F: interface), a display unit 18, a buffer memory 20, a processing unit 22, and a storage unit 24 and can be connected to an imaging system 100 or a product DB 200 (DB: database) via a network NW (NW: network). Hereinafter, each element of the inspection apparatus 10 will be described.

[Control Unit]

The control unit 12 (processor) includes a processor (for example, a central processing unit (CPU)) that controls an operation of each unit of the inspection apparatus 10. The control unit 12 receives operation input from the interpreter via the operation unit 14, and transmits a control signal corresponding to the operation input to each unit of the inspection apparatus 10 to control the operation of each unit including the processing unit 22. In addition, the control unit 12 causes the display unit 18 to display a display image, the discontinuity information, product information, inspection information, and the like. As a result, the interpreter can inspect an inspection target object OBJ by interpreting the image displayed on the display unit 18.

In addition, the control unit 12 includes a memory (non-transitory and tangible recording medium) (not shown) configured with a flash memory, a read-only memory (ROM), an electrically erasable programmable read-only memory (EEPROM), various semiconductor storage elements, or the like. A computer-readable code of an information processing program according to the embodiment of the present invention is recorded on this memory, the control unit 12 refers to this memory to execute an information processing method according to the embodiment of the present invention.

[Operation Unit]

The operation unit 14 is an input device that receives the operation input from the interpreter, and includes a keyboard for character input and a pointing device (a mouse, a trackball, or the like) for operating a pointer, an icon, or the like displayed on the display unit 18 (not shown). A touch panel can also be provided on a surface of the display unit 18 as the operation unit 14, instead of the means listed above or in addition to the means listed above. A user can perform an operation necessary to execute the information processing method and the information processing program according to the embodiment of the present invention via these devices. This operation includes, for example, operations such as setting a criterion of the discontinuity (first criterion or second criterion), correcting the discontinuity information, and condition settings such as extracting, displaying, or the like the discontinuity information.

[Interface (I/F)]

The I/F 16 is means for performing communication with an external device via the network NW. As a method of transmitting and receiving data between the inspection apparatus 10 and the external device, wired communication (for example, a local area network (LAN), a wide area network (WAN), Internet connection, or the like) or wireless communication (for example, LAN, WAN, Internet connection, or the like) can be used. The I/F 16 functions as an image acquisition unit and acquires a light-reception image that is obtained by irradiating the inspection target object with light rays (visible light, infrared light, or the like) or radiation and that is created based on reflected light or transmitted light from the inspection target object.

The inspection apparatus 10 can receive, via the I/F 16, input of inspection target object imaging data D100 including captured image data of the inspection target object OBJ (subject) imaged by the imaging system 100. Here, the captured image data is image data constituting the light-reception image. In addition, the method of inputting the inspection target object imaging data D100 from the imaging system 100 to the inspection apparatus 10 is not limited to the communication via the network NW listed above. For example, the inspection apparatus 10 and the imaging system 100 may be connected to each other by a universal serial bus (USB) cable, Bluetooth (registered trademark), infrared communication, or the like, or the inspection target object imaging data D100 may be stored in a memory card attachable to and detachable from and readable by the inspection apparatus 10, and the image data may be input to the inspection apparatus 10 via the memory card.

Further, the inspection apparatus 10 can communicate with the product database (product DB 200) via the network NW. Product data D200 for each industrial product that can be an inspection target is stored in the product DB 200. The control unit 12 can retrieve and read out inspection target object specification information for specifying the inspection target object from the inspection target object imaging data of the inspection target object OBJ acquired from the imaging system 100, and can acquire the product data D200 corresponding to the readout inspection target object specification information from the product DB 200. By using this product data D200, defect information and discontinuity information corresponding to the type or the feature of the inspection target object OBJ can be acquired.

The product DB 200 may be installed on the network NW as in the present embodiment so that the product data D200 is updatable by the manufacturer or the like, or the product DB 200 may be provided in the inspection apparatus 10.

[Display Unit]

The display unit 18 (display device) is a device that is controlled by the control unit 12 and that is used to display the light-reception image (image), the inspection information, the product information, the discontinuity information, and the like. As the display unit 18, for example, a liquid crystal monitor can be used, and a screen of a device such as a smartphone or a tablet terminal may also be used as the display unit 18.

[Buffer Memory]

The buffer memory 20 is configured with, for example, a storage device such as a random access memory (RAM) and is used as a work area of the control unit 12 or an area for temporarily storing the image data output to the display unit 18.

[Processing Unit]

Figure 2:
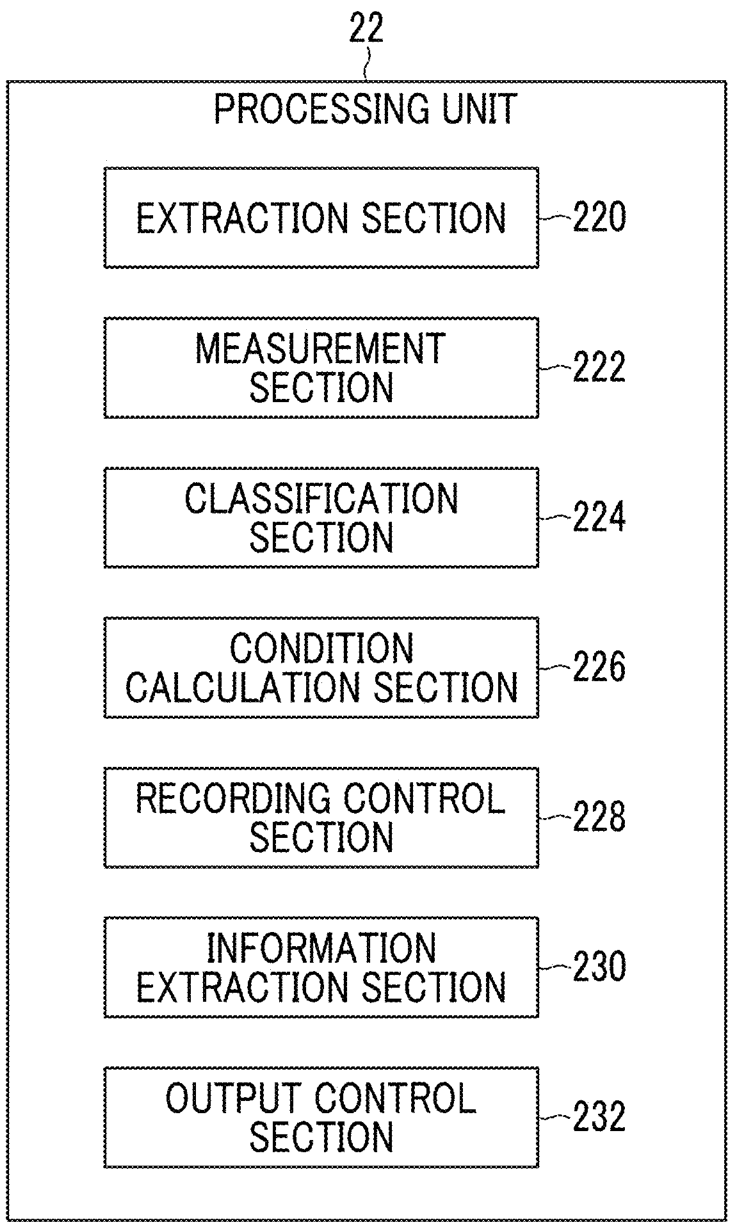
FIG. 2 is a block diagram showing an example of a function of a processing unit.

FIG. 2 is a block diagram showing an example of a function of the processing unit 22 (processor, information processing apparatus). As shown in FIG. 2, the processing unit 22 comprises an extraction section 220, a measurement section 222, and a classification section 224 and acquires time-series defect information and discontinuity information from the image of the inspection target object (subject). In addition, the processing unit 22 comprises a condition calculation section 226, a recording control section 228, an information extraction section 230, and an output control section 232, and records or outputs the discontinuity information. As will be described below, the processing unit 22 may detect, classify, and measure the discontinuity by using an image analyzer (learning model) constructed by a machine learning algorithm (refer to the section of "Acquisition of Discontinuity Information Using Image Analyzer")

[Extraction Section]

The extraction section 220 functions as an image processing unit and performs image processing (for example, color conversion processing, monochrome conversion processing, edge enhancement processing, conversion processing into three-dimensional data, and the like) on the captured image data to detect changes in color, brightness value, or the like of the inspection target object OBJ, thereby detecting discontinuities (for example, scratches, fissuring (cracks), wear, rust, and the like) of the inspection target object OBJ. The extraction section 220 analyzes the image with the first criterion and the second criterion, which will be described below, to detect the defect and the discontinuity based on, for example, a color change, an edge detection result, and the like. As a result, the position and the shape of the discontinuity are specified.

The extraction section 220 may detect the discontinuity by, for example, incorporating, into the product data D200, product image data including an image of a product (new product) in which the same defect of the inspection target object OBJ is not detected, and comparing the product image data with the captured image data of the inspection target object OBJ.

[Definition of Discontinuity and Defect]

In the present invention, for example, a discontinuous portion in the inspection target object (subject) such as a product can be defined as a "discontinuity (discontinuity)". In addition, among the "discontinuities", a discontinuity that exceeds a determination criterion defined in a standard, a specification, or the like, resulting in the product (subject) or the like being deemed defective in tests or inspections, can be defined as the "defect". In this case, the defect refers to a discontinuity that has been determined as the "defect" either by the interpreter or automatically among the detected "discontinuities". For example, a discontinuity having a predetermined major axis can be determined as the "defect". Therefore, the same processing (including analysis such as detection, classification, and measurement) can be performed on the "defect" and the "discontinuity".

[Measurement Section]

The measurement section 222 measures dimensions of each part of the inspection target object OBJ based on the captured image data of the inspection target object OBJ and imaging condition data. The measurement section 222 measures a size of the inspection target object OBJ based on, for example, the imaging condition data such as a distance between a camera during imaging and the inspection target object OBJ, a focal length, and a zoom magnification, and a size of the inspection target object OBJ in the captured image data (the size of the inspection target object OBJ may be acquired via the product data D200). The measurement section 222 calculates the size of the discontinuity (for example, a maximum dimension, a minimum dimension, a depth of the fissuring, an angle, and the like) by using the measured size of the inspection target object OBJ, the size of the inspection target object OBJ in the captured image data, and the size of the discontinuity in the captured image data. The measurement section 222 measures at least one of the type, the number, the position in the inspection target object OBJ (subject), the size, the shape, the presence density, or the distance from another discontinuity of the discontinuity.

The measurement section 222 may measure a thickness of the inspection target object OBJ for each position by using the dimensions of each part of the inspection target object OBJ and information indicating, for example, the reflectivity and the transmittance (transmission attenuation) of irradiation light during imaging of the inspection target object OBJ. The thickness may be measured by the imaging system 100 during imaging and incorporated into the inspection target object imaging data D100.

[Example of Measurement by Measurement Section]

Figure 3:
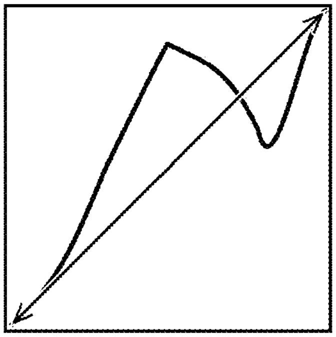
FIG. 3 is a diagram showing an example of a calculation method of a size of a discontinuity.

An example of the measurement performed by the measurement section 222 will be described. FIG. 3 is a diagram showing an example of a calculation method of the size of the discontinuity. As shown in FIG. 3, the measurement section 222 can use a length of a diagonal line of a rectangle that shows a minimum area encompassing the discontinuity in the image, as the size of the discontinuity. The measurement section 222 may calculate the size of the discontinuity by using another method (for example, refer to a modification example to be described below).

[Classification Section]

The classification section 224 assigns a discontinuity classification to the extracted discontinuity based on classification information stored in the storage unit 24. For example, the classification section 224 calculates a degree of similarity between the discontinuity extracted by the processing unit 22 and at least one of a discontinuity image corresponding to a discontinuity extracted in the past or information indicating the feature of the discontinuity image, and the classification section 224 assigns the discontinuity classification based on the degree of similarity. Here, the degree of similarity calculated by the classification section 224 is calculated by a known method. For example, the classification section 224 can calculate the degree of similarity by performing block matching between a discontinuity image extracted by the processing unit 22 and the discontinuity image extracted in the past. In addition, for example, the classification section 224 can calculate a degree of similarity between an extracted discontinuity candidate image and the discontinuity image (or the information indicating the feature of the discontinuity image) stored in the storage unit 24, and can assign a classification result assigned to the discontinuity image having the highest degree of similarity as the discontinuity classification in the discontinuity candidate image.

[Implementation of Function of Processing Unit]

The function of each unit of the processing unit 22 described above can be implemented by using various processors. The various processors include, for example, a central processing unit (CPU) which is a general-purpose processor that implements various functions by executing software (programs). In addition, the various processors described above include a programmable logic device (PLD) which is a processor whose circuit configuration can be changed after manufacturing such as a field programmable gate array (FPGA). Further, the various processors also include a dedicated electrical circuit which is a processor that has a dedicated electrical circuit configuration designed to execute specific processing such as an application specific integrated circuit (ASIC), and the like.

The function of each unit may be implemented by one processor or a combination of a plurality of processors. In addition, a plurality of functions may be implemented by one processor. A first example in which a plurality of functions are configured with one processor is, as represented by a computer such as a client or a server, an aspect in which one or more CPUs and software are combined to configure one processor and the processor implements the plurality of functions. A second example of the configuration is, as represented by a system-on-chip (SoC) or the like, an aspect in which a processor that implements the functions of the entire system by using one integrated circuit (IC) chip is used. As described above, various functions are configured by using one or more of the above-described various processors as a hardware structure. Further, the hardware structure of these various processors is, more specifically, electrical circuits (circuitry) in which circuit elements, such as semiconductor elements, are combined.

In a case where the above-described processor or electrical circuit executes software (programs), a processor readable code (or a computer readable code, the computer constructed by using the processor) of the software to be executed is stored in a non-transitory and tangible recording medium, such as ROM, and the processor refers to the software. The software stored in such a recording medium includes a program (information processing program) for executing the information processing method according to the embodiment of the present invention. The code may be recorded on a non-transitory and tangible recording medium, such as various optical magnetic recording devices and semiconductor memories, instead of the ROM. In a case of processing using software, for example, the buffer memory 20 can be used as a transitory storage area, and data stored in an electronically erasable and programmable read only memory (EEPROM) (not shown) can also be referred to.

The above-described "non-transitory and tangible recording medium" does not include a non-tangible recording medium such as a carrier wave signal or a propagation signal itself.

[Storage Unit]

The storage unit 24 is means for storing data including a control program used by the control unit 12. As the storage unit 24, for example, devices such as a device including a magnetic disk such as a hard disk drive (HDD), a device including a flash memory such as an embedded multi-media card (eMMC) or a solid state drive (SSD) can be used. These devices are examples of the recording device or the non-transitory and tangible recording medium. The storage unit 24 stores the inspection target object imaging data D100, the product data D200, the discontinuity information, and the like.

In addition, the storage unit 24 can store a discontinuity classification result input via the operation unit 14. In this case, the operation unit 14 functions as an input unit for inputting the classification result to be stored in the storage unit 24, and the storage unit 24 stores the classification result based on classification input through the input unit. For example, the storage unit 24 may receive input of the type of the discontinuity (defect) as described in "JIS Z 2300" for classification and assignment, or may store the type of the discontinuity in a case where the type of the discontinuity defined by the user himself/herself is input via the operation unit 14. Further, for example, the storage unit 24 may store the classification result classified based on an occurrence cause of the discontinuity. Here, examples of the "occurrence cause of the discontinuity" include air bubbles due to gas inclusion, cracks in members, foreign matter adhesion, welding, and welding defects.

Further, the information (data) stored in the storage unit 24 may be updated. For example, the information stored in the storage unit 24 may be updated by sequentially storing an interpretation result interpreted by the interpreter through the inspection apparatus 10 in the storage unit 24.

The interpreter can input, via the operation unit 14, for example, diagnosis results, such as "immediately replace the inspection target object OBJ with a new one", "observe the progress (re-inspect)", or "leave it untouched (not a discontinuity)", for each piece of the information related to the defect candidate image assigned to the image displayed on the display unit 18. The control unit 12 creates inspection target object inspection result data D10 (refer to FIG. 6) including diagnosis result data described above and stores the inspection target object inspection result data D10 in the storage unit 24. As a result, the information (data) stored in the storage unit 24 is updated.

Figure 4:
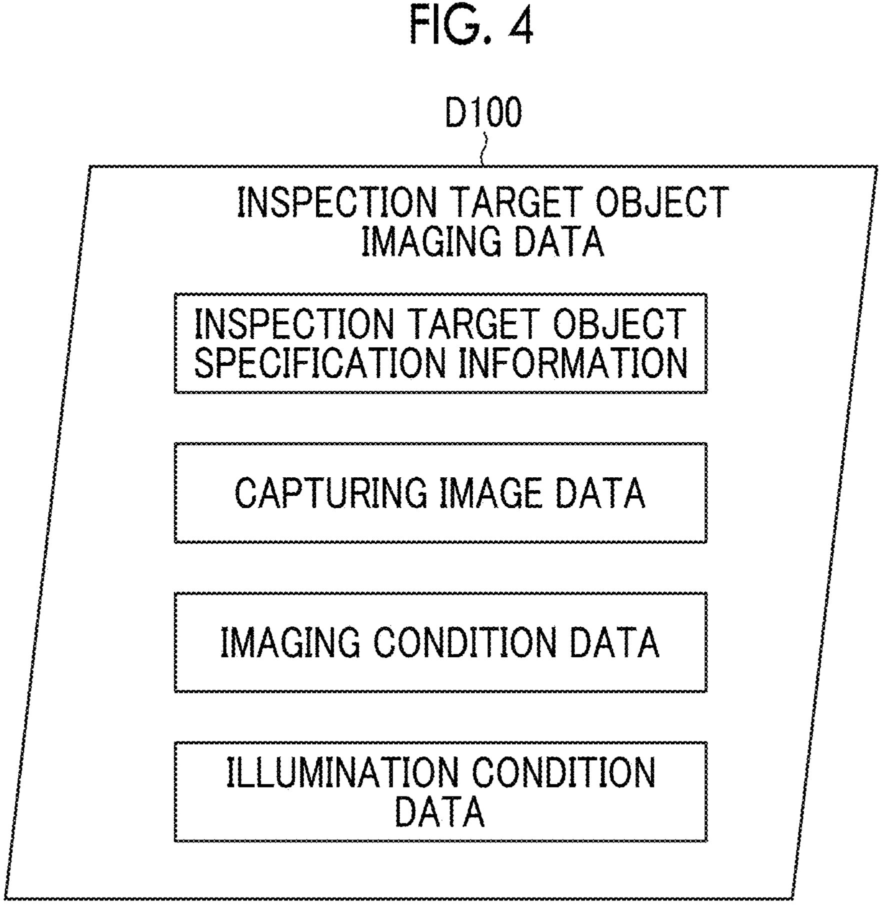
FIG. 4 is a block diagram showing an example of inspection target object imaging data.

FIG. 4 is a block diagram showing an example of the inspection target object imaging data. As shown in FIG. 4, the inspection target object imaging data D100 includes inspection target object specification information, captured image data, imaging condition data, and illumination condition data.

The inspection target object specification information is information for specifying the inspection target object OBJ and includes, for example, information indicating a product name, a product number, a manufacturer name, and a technical classification of the inspection target object OBJ.

The captured image data is image data (for example, an X-ray image (radiation transmission image), a visible light image, or an infrared light image) obtained by imaging the inspection target object OBJ.

The imaging condition data is stored for each piece of the captured image data of the inspection target object OBJ and includes information indicating an imaging date and time, an imaging target location of each piece of the captured image data, a distance between the inspection target object OBJ and the camera during imaging, and an angle with respect to the camera.

The illumination condition data includes information indicating a type of radiation or light used for imaging of the inspection target object OBJ (for example, X-rays, visible light rays, infrared light rays, transmitted light rays, reflected light rays), an irradiation intensity, and an irradiation angle.

Figure 5:
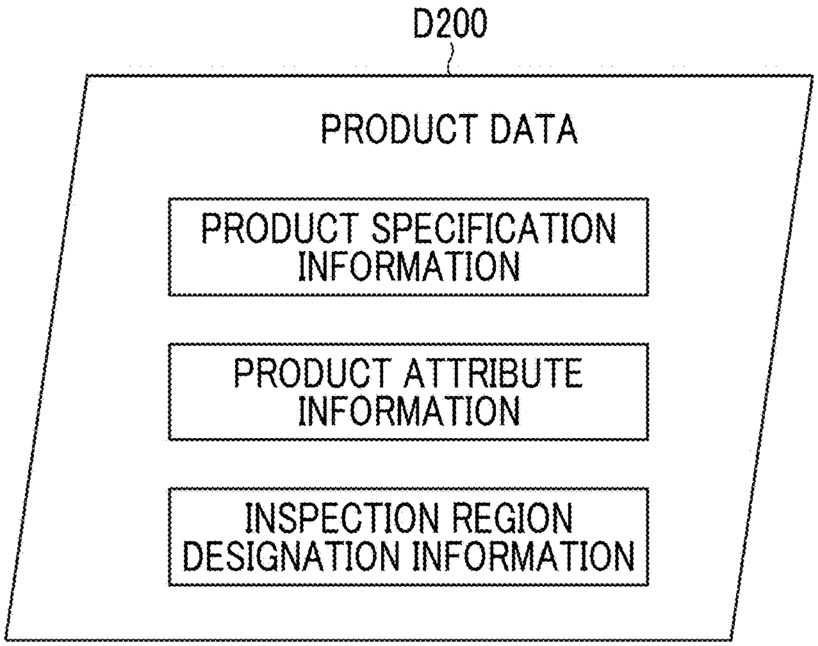
FIG. 5 is a block diagram showing an example of product data.

FIG. 5 is a block diagram showing an example of the product data. As shown in FIG. 5, the product information includes product specification information, product attribute information, and inspection region designation information. The product data D200 may be recorded on the storage unit 24 in association with the inspection target object imaging data D100 and the inspection target object inspection result data D10 via the inspection target object specification information and the product specification information, or may be acquired from the product DB 200 each time of the inspection.

The product specification information is information for specifying the product and includes, for example, information indicating a product name, a product number, a manufacturer name, and a technical classification.

The product attribute information includes, for example, information indicating a material and dimensions of each part of the product, and an application of the product. The information indicating the application of the product includes, for example, information regarding a name, a type, a processing state, and an attachment method (for example, joints, welds, screwing, fitting, and soldering) of a device to which the product is attached, or the like. In addition, the product attribute information includes discontinuity occurrence information. The discontinuity occurrence information includes, for example, at least one information of a past inspection date and time, a material of the inspection target object OBJ, a type of the discontinuity that has occurred in the past (for example, gas hole, porosity, foreign material less dense (FMLD), foreign material more dense (FMMD), fissuring, delamination, or the like), a shape, a size, a depth, an occurrence site (site coordinates, a material thickness, and a processing state (for example, joints, welds, or the like), frequency information related to the occurrence frequency of the discontinuity, or a discontinuity image.

The inspection region designation information includes information indicating an inspection region in the inspection target object, which is designated by the manufacturer or the like of each product. The inspection region designation information is created, for example, by specifying a location where the discontinuity is likely to occur statistically or structurally based on information in a case where the manufacturer or the like has repaired the product in the past.

Figure 6:
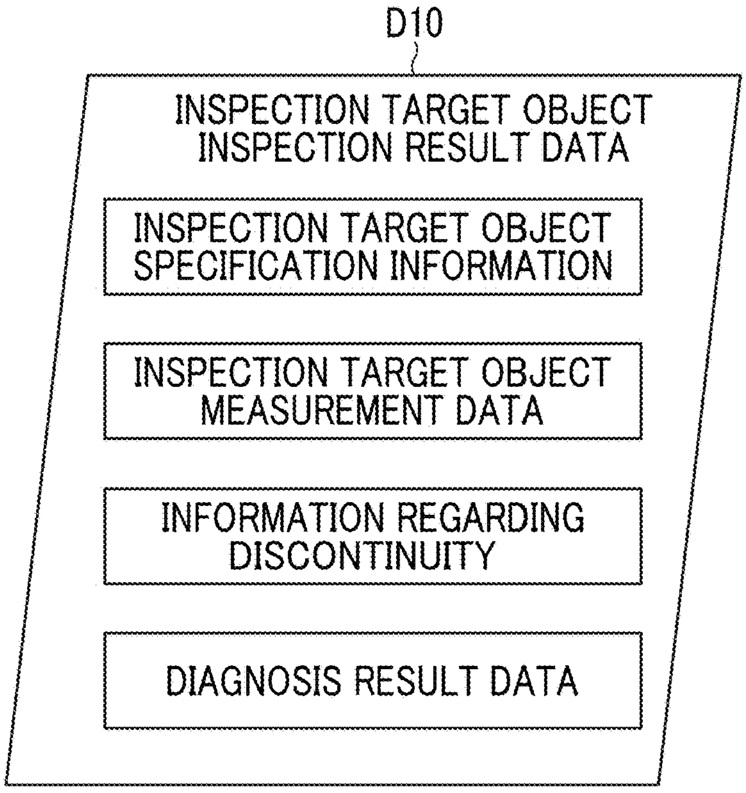
FIG. 6 is a block diagram showing an example of inspection target object inspection result data.

FIG. 6 is a block diagram showing an example of the inspection target object inspection result data. As shown in FIG. 6, the inspection target object inspection result data D10 includes inspection target object measurement data, information regarding the discontinuity (discontinuity information), and diagnosis result data, in addition to the above-described inspection target object specification information. The inspection target object inspection result data D10 is associated with the inspection target object imaging data D100 via the inspection target object specification information and is recorded on the storage unit 24.

The inspection target object measurement data includes information indicating the size of the inspection target object OBJ and a measurement result of the thickness by the measurement section 222 for each position of the inspection target object OBJ.

The information regarding the discontinuity includes information indicating the feature of the discontinuity (for example, a position, a size, a thickness change amount, and a type of the discontinuity). The position of the discontinuity can be represented by, for example, coordinates on a coordinate system (for example, a three-dimensional rectangular Cartesian coordinate system, a polar coordinate system, a cylindrical coordinate system, or the like) set according to the shape of the inspection target object OBJ. The information indicating the type of the discontinuity is information to be assigned to the classification section 224 as described above and is, for example, information such as a granular discontinuity, a spot-like discontinuity, and a crack-like discontinuity.

The diagnosis result data may include an inspection date and time and information additionally input or corrected by the interpreter with respect to the discontinuity. The diagnosis result data is, for example, "It is a discontinuity. The classification is a foreign matter shadow.", "It is not a discontinuity.", and the like. Further, the diagnosis result data may include, for example, information indicating the diagnosis result input by the interpreter, such as "immediately replace the inspection target object OBJ with a new one", "observe the progress (re-inspect)", "leave it untouched", and "classify it as a defective product because a defect is present".

[Configuration of Imaging System]

Figure 7:
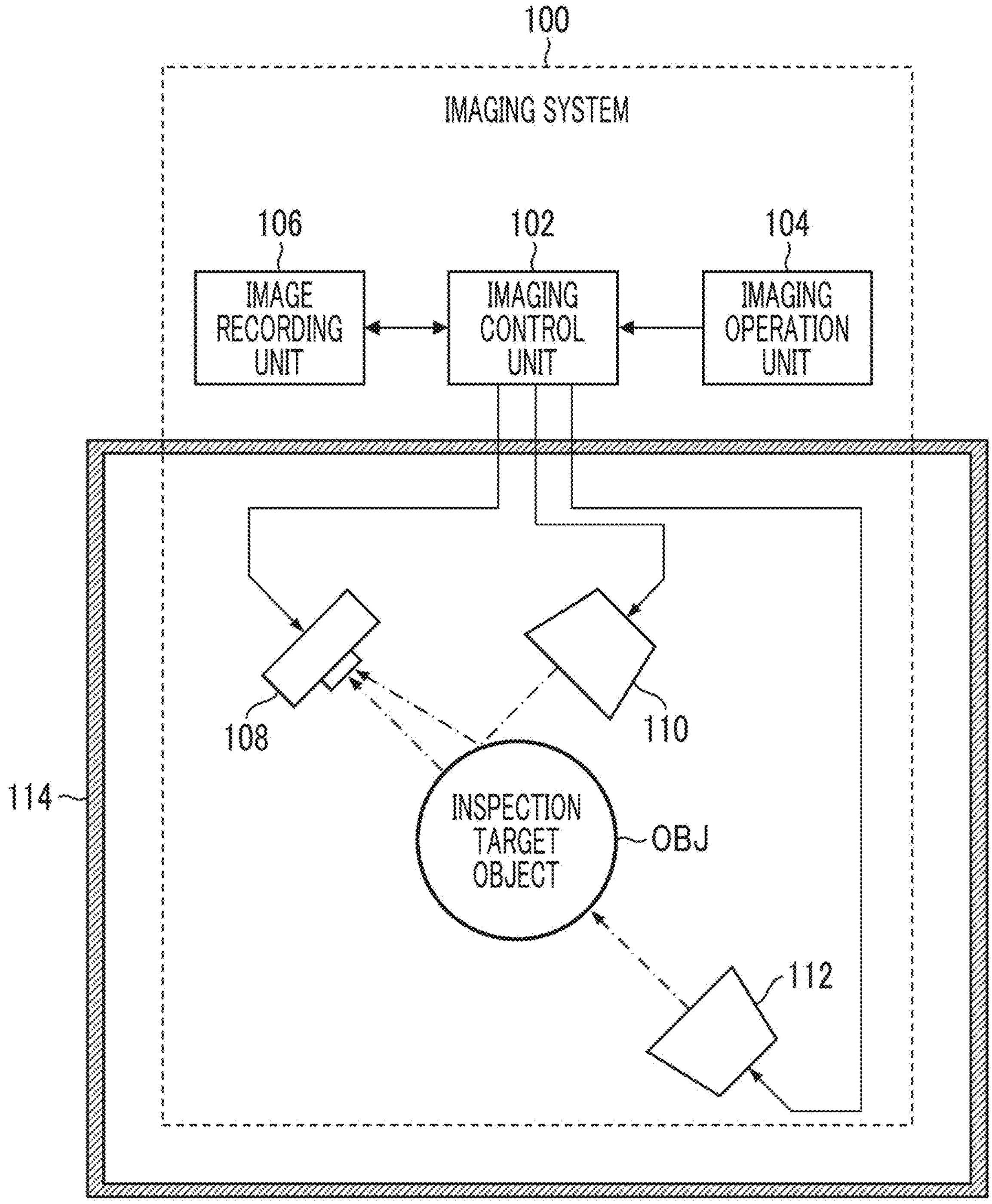
FIG. 7 is a block diagram showing an example of an imaging system.

Next, the imaging system 100 for capturing the image of the inspection target object OBJ will be described. FIG. 7 is a block diagram showing an example of the imaging system 100. The imaging system 100 is a system for imaging the inspection target object OBJ placed in an imaging room 114 and as shown in FIG. 7, comprises an imaging control unit 102, an imaging operation unit 104, an image recording unit 106, a camera 108, and radiation sources 110 and 112.

The imaging control unit 102 includes a central processing unit (CPU) that controls an operation of each unit of the imaging system 100. The imaging control unit 102 receives operation input from an operator (imaging technician) via the imaging operation unit 104 and transmits a control signal corresponding to the operation input to each unit of the imaging system 100 to control the operation of each unit.

The imaging operation unit 104 is an input device that receives the operation input from the operator, and includes a keyboard for character input and a pointing device (a mouse, a trackball, or the like) for operating a pointer, an icon, and the like displayed on the display unit 18. The operator can perform, via the imaging operation unit 104, input of information regarding the inspection target object OBJ, input of an instruction to execute imaging to the camera 108 (including settings for imaging conditions, such as an exposure time, a focal length, and a stop, and an imaging angle, an imaging location, and the like), input of an instruction of radiation irradiation to the radiation sources 110 and 112 (including settings for an irradiation start time, an irradiation duration, an irradiation angle, an irradiation intensity, and the like), and input of an instruction to record the acquired image data on the image recording unit 106.

The image recording unit 106 records the image data (light-reception image) of the inspection target object OBJ imaged by the camera 108. The image recording unit 106 records the information for specifying the inspection target object OBJ in association with the image data.

The camera 108 and the radiation sources 110 and 112 are disposed inside the imaging room 114. The radiation sources 110 and 112 are, for example, X-ray sources, and partition walls and entrances/exits between the imaging room 114 and the outside are shielded with X-ray protective materials (for example, lead, concrete, or the like) to provide X-ray protection. In a case where the inspection target object OBJ is irradiated with visible light for imaging, there is no need to use the shielded imaging room 114.

The radiation sources 110 and 112 irradiate the inspection target object OBJ placed in the imaging room 114 with radiation in accordance with an instruction from the imaging control unit 102.

The camera 108 images the inspection target object OBJ by receiving radiation emitted from the radiation source 110 to the inspection target object OBJ and reflected by the inspection target object OBJ, or radiation emitted from the radiation source 112 to the inspection target object OBJ and transmitted through the inspection target object OBJ, in accordance with an instruction to execute imaging from the imaging control unit 102. The inspection target object OBJ is held in the imaging room 114 by a holding member (not shown) (for example, a manipulator, a mounting table, or a movable mounting table), and the distance and the angle of the inspection target object OBJ with respect to the camera 108 and the radiation sources 110 and 112 are adjustable. The operator can image a desired location of the inspection target object OBJ by controlling the relative positions between the inspection target object OBJ, the camera 108, and the radiation sources 110 and 112 via the imaging control unit 102.

The radiation sources 110 and 112 end the irradiation of the inspection target object OBJ with the radiation in synchronization with the end of the execution of the imaging by the camera 108.

In the example shown in FIG. 7, the camera 108 is disposed inside the imaging room 114, but the camera 108 may be disposed outside as long as it can image the inspection target object OBJ inside the imaging room 114. In addition, in the example shown in FIG. 7, one camera 108 and two radiation sources 110 and 112 are provided, but the number of the cameras and the radiation sources is not limited to this. For example, a plurality of the cameras and a plurality of the radiation sources may be provided, or one camera and one radiation source may be provided.

[Overview of Acquisition and Recording of Information]

Figure 8:
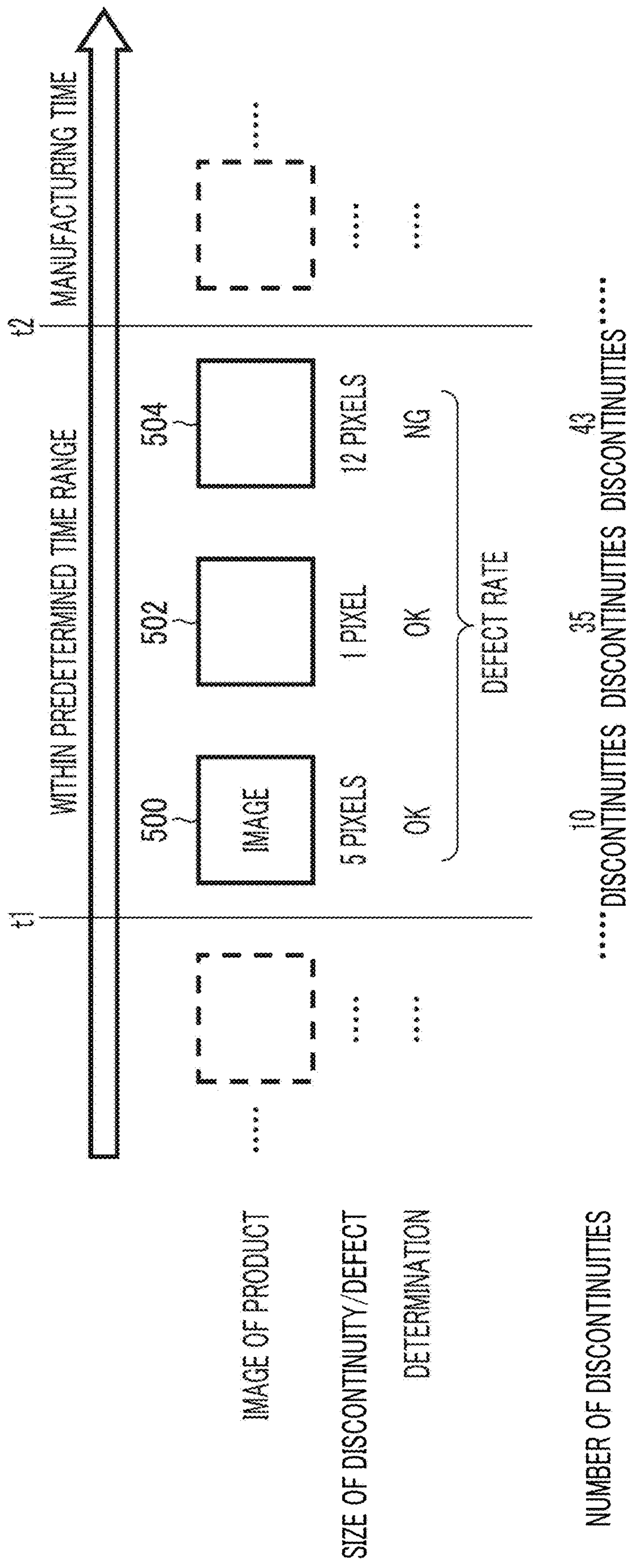
FIG. 8 is a diagram showing an example of acquiring time-series discontinuity information.

FIG. 8 is a diagram showing an example of acquiring the time-series discontinuity information. FIG. 8 shows a state in which a time-series image of the product (inspection target object, subject) is acquired in association with a manufacturing time. The manufacturing time is an example of the "information regarding the arrangement of the subject" in the present invention. The "information regarding the arrangement of the subject" is information based on which the order of the subject can be determined, and may have a component related to time such as information regarding the occurrence timing of the discontinuity. As the "information regarding the arrangement of the subject" and the "information related to the occurrence timing of the discontinuity", for example, at least one of a manufacturing time, a manufacturing number (serial number), a lot number, an inspection time, an inspection number, or an image capturing time of the inspection target object OBJ (subject) can be acquired. The "time" need not be specified down to hours, minutes, and seconds.

The "size of the discontinuity/defect" indicates the size (an example of the first discontinuity information and the second discontinuity information) of the discontinuity (or defect) in the image of each product, which is extracted and measured by the processing unit 22 (the extraction section 220 and the measurement section 222: processor), in the number of pixels. In the example of FIG. 8, the determination criterion of the defect is 10 pixels or more (an example of the "first criterion"), and the product is deemed defective (NG: no good) in a case where there is any defect. In addition, in the example of FIG. 8, the determination criterion of the discontinuity is three or more pixels (an example of "the second criterion that is stricter than the first criterion"), and the product is deemed acceptable (OK) even in a case where there is a discontinuity.

In the example of FIG. 8, it is assumed that an image 500 captured at time t1 to time t2 has 10 discontinuities of 5 pixels each, an image 502 has 35 discontinuities of 1 pixel each, and an image 504 has 43 discontinuities (one of which has a size of 12 pixels and corresponds to a defect) (the first discontinuity information and the second discontinuity information). In this case, the product of the image 500 and the product of the image 502 are acceptable, and the product of the image 504 is defective because a defect is present in the image 504. In addition, in a case where the occurrence frequency of the defect (here, a ratio of the defective product to the total number of products) is 1/3 and the determination criterion value is 1/10, the occurrence frequency of the defect is higher than the determination criterion value. Therefore, in the example of FIG. 8, the condition calculation section 226 (processor) calculates a period from time t1 to time t2 as a recording target period based on the presence of the defect (first discontinuity information) (a period calculation step, a condition calculation step, and a condition calculation process), and the recording control section 228 (processor) records the number of discontinuities (10, 35, and 43 discontinuities; the second discontinuity information) in the images 500 to 504 on the storage unit 24 (recording device) in association with times t1 and t2 (information indicating the recording condition) (a recording control step and a recording control process). Recording the discontinuity information for the period (specific period) from time t1 to time t2 is an example of the calculation of the recording condition and the recording control, and the condition calculation section 226 and the recording control section 228 may calculate a specific manufacturing number, lot number, inspection time, inspection number, image capturing time, or the like as the recording condition and may record the discontinuity information under the condition.

[Details of Acquisition and Recording of Information]

[Acquisition of Image]

In the first embodiment, the image of the inspection target object OBJ (subject) can be acquired by the imaging system 100 and the inspection apparatus 10. The image can be acquired in time series. The imaging may be performed at a predetermined timing such as every day, every week, every month, or once a week. In addition, images of different individual objects (parts, products, or the like that are continuously manufactured) of the same type of the inspection target object OBJ may be sequentially captured, or images of the same individual object may be repeatedly captured (information on changes over time may be acquired). It is preferable to image the inspection target object OBJ from the same direction (which may be one direction or a plurality of directions).

[Acquisition of First Discontinuity Information]

The processing unit 22 can acquire the discontinuity information (first discontinuity information) by analyzing the obtained time-series image of the inspection target object OBJ (subject) with the first criterion (a first information acquisition step and a first information acquisition process). Here, the "first criterion" is a criterion for at least one of the type, the number, the position in the subject, the size, the shape, the presence density, or the distance from another discontinuity of the discontinuity. In addition, the discontinuity information includes information indicating the feature of the discontinuity and information related to the occurrence timing of the discontinuity. The "information indicating the feature of the discontinuity" is information indicating at least one of the type, the number, the position in the inspection target object OBJ (subject), the size, the shape, the presence density, or the distance from another discontinuity of the discontinuity. Further, the "information corresponding to the occurrence time of the discontinuity" may be the occurrence timing (for example, the occurrence time) itself or may be other information related to the occurrence timing (for example, at least one of the manufacturing time, the manufacturing number (serial number), the lot number, the inspection time, the inspection number, or the image capturing time of the inspection target object OBJ (subject)). The occurrence timing or the occurrence time need not be strictly specified (for example, need not be specified down to the date and time or hours, minutes, and seconds).

The processing unit 22 (processor) can also acquire information on the "defect" (a discontinuity at a level at which the product is defective) as the "first discontinuity information" by setting a level of the "first criterion" (for example, a size of 4 mm or more).

[Calculation of Recording Condition]

The condition calculation section 226 can obtain a range of the discontinuity information to be recorded, based on the information regarding the arrangement and/or the first discontinuity information. For example, the condition calculation section 226 (processor) calculates the recording target period (a period in which the first discontinuity information and/or the second discontinuity information is recorded) and the recording condition based on the first discontinuity information (the condition calculation step and the condition calculation process). The condition calculation section 226 can calculate, for example, a period in which the occurrence frequency of the discontinuity having a predetermined feature (for example, the size) is higher than the determination criterion value, a period in which the occurrence frequency is equal to or lower than the determination criterion value, and a period in which the occurrence frequency falls within the determination criterion range, as the recording target period. The condition calculation section 226 may calculate a period in which the first discontinuity information is present (first period) as the recording target period or may calculate the first period and a second period preceding the first period as the recording target period.

As the determination criterion value (determination criterion range) of the occurrence frequency, the condition calculation section 226 can use a criterion set for the number of occurrences of the discontinuity having a predetermined feature in a predetermined period (one day, one week, one month, or the like) or a predetermined number of inspection target objects (one, ten, one hundred, or the like).

In a case of being based on the information regarding the arrangement, the condition calculation section 226 can record the discontinuity information for the subject having a designated range of manufacturing numbers or lot numbers, for example.

The discontinuity information for such a recording target period is effective for predicting the occurrence of the discontinuity (or defect) or analyzing the discontinuity information before the occurrence of the defect. That is, according to the above-described aspect, it is possible to record useful discontinuity information of the subject.

The condition calculation section 226 can calculate a condition for at least one of a specific period, a manufacturing number, a lot number, an inspection time, an inspection number, or an image capturing time as the "recording condition".

[Acquisition of Second Discontinuity Information]

The processing unit 22 (processor) can acquire the second discontinuity information (including the information indicating the feature of the discontinuity and the information corresponding to the occurrence time of the discontinuity) by analyzing the image of the inspection target object OBJ (subject) with the second criterion that is stricter than the first criterion (a second information acquisition step and a second information acquisition process). The processing unit 22 may acquire the second discontinuity information based on the above-described recording condition. The second discontinuity information may be time-series information. In addition, the item of the "information indicating the feature of the discontinuity" and the item of the "information related to the occurrence timing of the discontinuity" may be the same as in the case of the first discontinuity information.

Further, similar to the first criterion, the second criterion is a criterion for at least one of the type, the number, the position in the inspection target object OBJ (subject), the size, the shape, the presence density, or the distance from another discontinuity of the discontinuity, but is a criterion that is stricter than the first criterion. The "second criterion being stricter than the first criterion" means that the discontinuity information is acquired by using the second criterion for a discontinuity that has a lower influence on quality and/or performance of the inspection target object OBJ (subject) than the discontinuity obtained by being analyzed by the first criterion. For example, discontinuities such as air bubbles, pores, or fissuring may be considered "defects" and result in the inspection target object OBJ being deemed defective, for example, in a case where the discontinuities are large or have a high density. However, for example, in a case where the discontinuities are small or have a low density, the discontinuities can be considered to have a low influence on the quality and/or the performance of the inspection target object OBJ (considered acceptable as a product). The processing unit 22 (processor) can use the criterion set by the user via the operation unit 14 as the first criterion and the second criterion.

[Example of Discontinuity Information]

FIG. 9 is a table showing an example of the discontinuity information (the first discontinuity information and the second discontinuity information) in the inspection target object OBJ (subject). In the example of FIG. 9, the discontinuity information includes identification (ID: identification information) of each discontinuity, a type of the discontinuity, a major axis (size), a position x and a position y (a position in the subject), and a classification of defect/non-defect. In the example of FIG. 9, the classification section 224 (processor) classifies the discontinuity having a major axis of 4 mm or more (first criterion) as the defect.

In addition to the example shown in FIG. 9, the discontinuity information may include the number of discontinuities (which may be determined by assigning consecutive numbers to IDs), the presence density, the distance from another discontinuity, and the like. The recording control section 228 (processor) can record the discontinuity information on the recording device, such as the storage unit 24, in association with the information indicating the recording target period.

FIG. 10 is a table showing another example of the discontinuity information. The numerical values of the example shown in FIG. 10 are the same as those in FIG. 9, but the classification section 224 (processor) classifies the "discontinuity (discontinuity that is not a defect)" into the "discontinuity to be focused on" (indicated as "YES" in the figure) and "other discontinuities". In detail, the classification section 224 sets, in addition to the "first criterion" (a major axis of 4 mm or more) and the "second criterion that is stricter than the first criterion" (a major axis of less than 1.5 mm), "a third criterion that is stricter than the first criterion and milder than the second criterion (a major axis of 1.5 mm or more and less than 4 mm)", and classifies a discontinuity that satisfies the third criterion as the "discontinuity to be focused on". The classification section 224 may set a criterion for the "discontinuity to be focused on" for other items such as a combination of the type and the major axis, an area, and the like, in addition to the major axis, and use the criterion. In addition, the processing unit 22 may set or change the values of the first to third criteria based on the operation of the user via the operation unit 14.

[Recording of Discontinuity Information]

The recording control section 228 (processor) records the discontinuity information (second discontinuity information) in the recording target period on the storage unit 24 (recording device) in association with the information indicating the recording target period (a recording step and a recording process). Here, the "information indicating the recording target period" may be, instead of the occurrence timing itself, other information (for example, at least one of the manufacturing time, the manufacturing number (serial number), the lot number, the inspection time, the inspection number, or image capturing time of the inspection target object OBJ (subject)), similar to the "information related to the occurrence timing of the discontinuity" described above. In addition, the format of the recording is not particularly limited and may be a format illustrated in FIGS. 9 and 10.

The recording control section 228 can associate, during recording, the first discontinuity information and the second discontinuity information with each other based on the recording condition. Examples of the association include creating separate files with partially common file names, storing two pieces of discontinuity information in the same folder, or recording both pieces of information in the recording target period on a single file.

The recording control section 228 (processor) may perform recording for a predetermined region in the inspection target object OBJ (subject). The "predetermined region" may be a partial region of the inspection target object OBJ (for example, a region identified to have a high occurrence frequency of discontinuities in past inspections, a region having a high influence on the performance or the quality of the entire product, a region designated by the user, or the like). By performing the recording for such a region, useful discontinuity information can be recorded. The determination of whether the region is the "predetermined region or not" can be made based on the measured position. In addition, the recording control section 228 may refer to, during recording, the "inspection region designation information" included in the product data D200 shown in FIG. 5.

[Example of Extraction and Output of Information]

The information extraction section 230 (processor) and the output control section 232 (processor) can extract information from the recorded information under the condition designated by the operation of the user and can output the extracted information. In addition, the information extraction section 230 and the output control section 232 may extract and output the information regardless of the operation of the user. Hereinafter, an example of the extraction and output (recording and display) of the information will be described. In the following examples, it is assumed that the same type of the inspection target object OBJ is continuously manufactured and imaged, and the time-series discontinuity information as shown in FIGS. 9 and 10 is acquired.

Example 1

Figure 11:
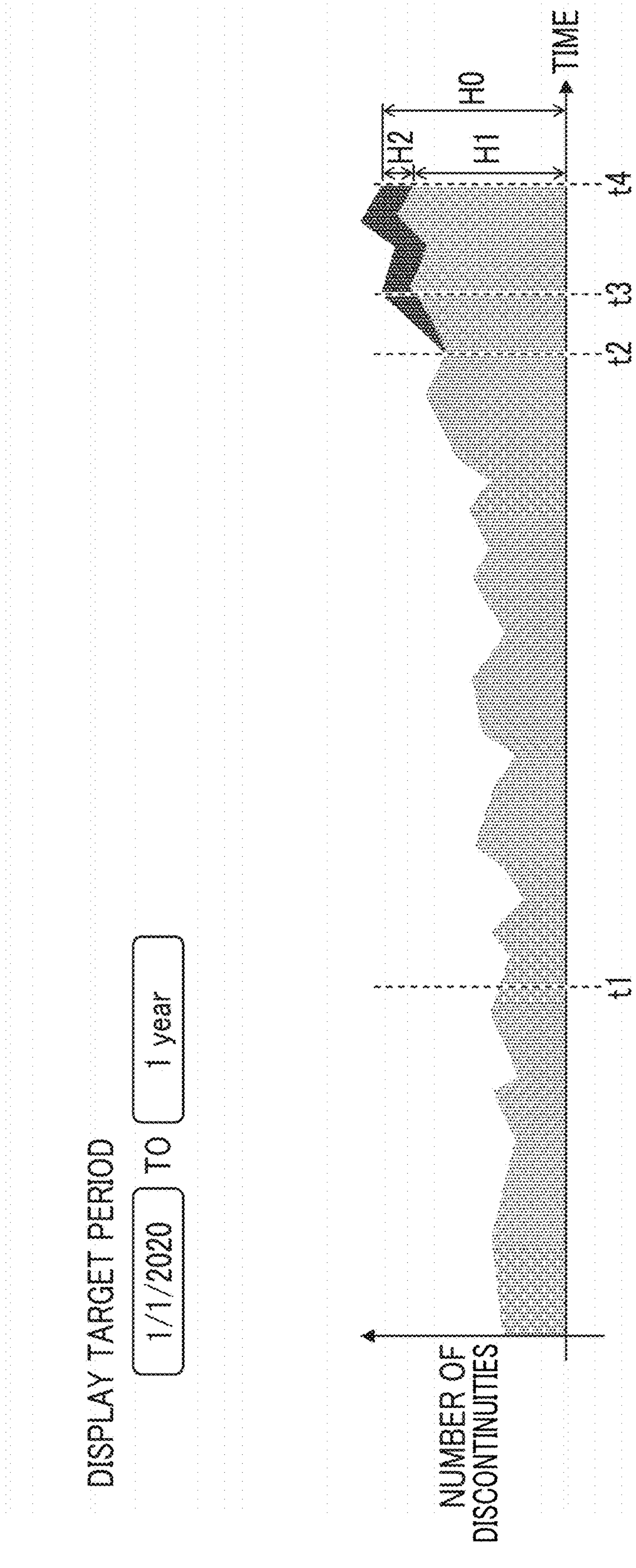
FIG. 11 is a diagram showing an example of recording, extracting, and displaying the discontinuity information.

FIG. 11 is a diagram showing an example of recording, extracting, and displaying the discontinuity information. In the example of FIG. 11, discontinuities at a level that does not lead to the defect continue to occur. In addition, defects start to occur from time t2, and the number of defects increases after time t3 onwards. It is assumed that the number of defects (or the occurrence frequency of the defect) is higher than the determination criterion value at time t3 to time t4. In FIG. 11, a height H1 indicates the number of discontinuities at a level that does not lead to the defect, a height H2 indicates the number of discontinuities corresponding to the "defect", and a height H0 indicates the total number of discontinuities.

In the above-described situation, the information extraction section 230 extracts, from the information recorded on the storage unit 24, the discontinuity information (which may include information on the defect and information on the discontinuity that does not lead to the defect; the same applies hereinafter), for example, in the period from time t3 to time t4, and the output control section 232 outputs the extracted discontinuity information. The output control section 232 may output the discontinuity information to the recording device, such as the storage unit 24, or may output the discontinuity information to the display device, such as the display unit 18.

In the example of FIG. 11, the information extraction section 230 and the output control section 232 may extract and output the discontinuity information for a period after time t2 at which the defects start to occur. In addition, the information may also be extracted and output for a period even earlier than time t2, for example, a period after time t1, or the entire period of the graph in FIG. 11 (the same applies to examples to be described below). The discontinuity information for such a period is effective for predicting the occurrence of the defect and the discontinuity and for analyzing the discontinuity information in a case where the defect occurs (or before the defect occurs). That is, according to the present invention, it is possible to record useful discontinuity information of the subject.

In FIG. 11, a case is shown in which defects do not occur until time t2 and start to occur after time t2. However, in a case where the same type of parts or products are continuously manufactured, or the like, defects may occur intermittently (defective products may occur intermittently). In such a case, the discontinuity information may be individually recorded, extracted, output, or the like for a plurality of periods in which defects have occurred, or the discontinuity information may be recorded, extracted, output, or the like for a period including the plurality of periods in which the defects have occurred.

In a case where the discontinuity information is displayed in a graph as shown in FIG. 11, the information extraction section 230 and the output control section 232 may use, instead of the time itself, at least one of the manufacturing time, the manufacturing number (serial number), the lot number, the inspection time, the inspection number, or the image capturing time of the inspection target object OBJ (subject) (the information related to the occurrence timing of the discontinuity) as a variable of the horizontal axis. In addition, the information extraction section 230 and the output control section 232 may use, as a variable of the vertical axis displayed in the graph, other variables such as the area of the discontinuity in addition to the number of discontinuities or defects.

In the examples of FIG. 11 and subsequent examples, the output format of the discontinuity information is not limited to the graph format, and the output control section 232 may output the information in other formats (for example, a table format, a figure format, or the like). In addition, the output control section 232 may display a discontinuity at a level corresponding to the defect and a discontinuity at a level that does not lead to the defect, and/or a "discontinuity to be focused on" and "other discontinuities" in an identifiable manner by adding or changing line types, colors, characters, figures, symbols, or numbers.

Example 2

Figure 12:
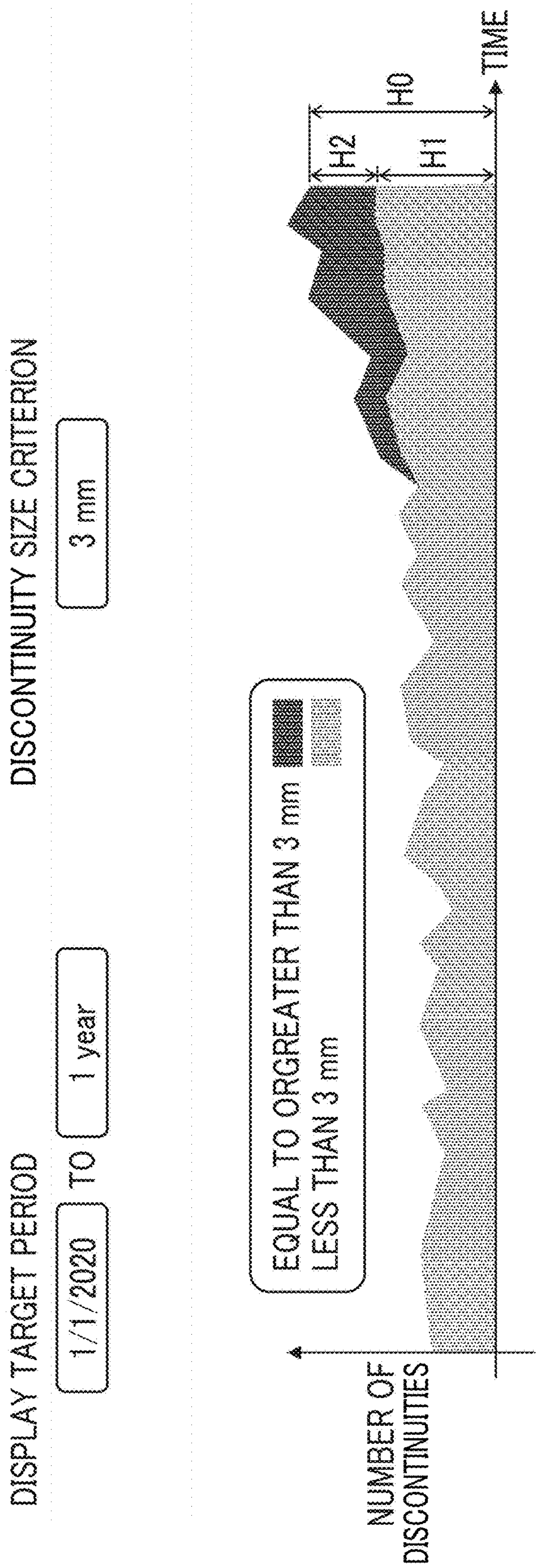
FIG. 12 is a diagram showing another output example (display example) of the discontinuity information.

FIG. 12 is a diagram showing another output example (display example) of the discontinuity information. In the example of FIG. 12, the processing unit 22 (processor) designates a display target period and a criterion value (here, the size of the discontinuity is 3 mm) in accordance with the operation of the user via the operation unit 14, and the output control section 232 displays a discontinuity equal to or greater than the criterion value and a discontinuity less than the criterion value on the graph by using colors of the graph in an identifiable manner. In addition, the height H1 indicates the number of discontinuities less than the criterion value, the height H2 indicates the number of discontinuities equal to or greater than the criterion value, and the height H0 indicates the total number of discontinuities. In the example of FIG. 12, the period for extracting and displaying the information can be set in the same manner as in the example of FIG. 11. By displaying such discontinuity information, the user can easily understand the occurrence status of the discontinuity.

Example 3

Figure 13:
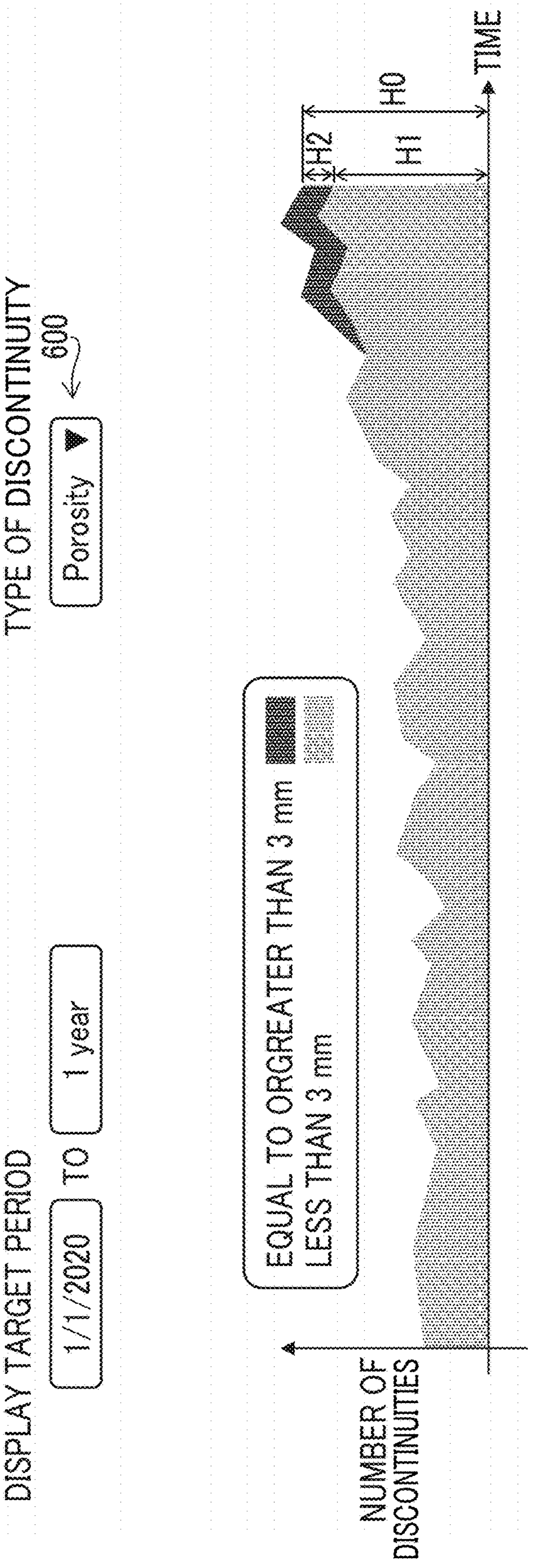
FIG. 13 is a diagram showing still another output example (display example) of the discontinuity information.

FIG. 13 is a diagram showing still another output example (display example) of the discontinuity information. In the example of FIG. 13, the processing unit 22 sets the display target period and the type of the discontinuity (here, the porosity) in accordance with the operation of the user via the operation unit 14 (including the selection of the type of the discontinuity through a dropdown list 600 and the setting of the criterion value of the size of the discontinuity), and the information extraction section 230 extracts the discontinuity information in accordance with the set condition. The output control section 232 displays a temporal change in the number of discontinuities (porosities) in a graph on the display unit 18. In addition, the output control section 232 displays the discontinuity equal to or greater than the criterion value (3 mm) and the discontinuity less than the criterion value in an identifiable manner, similar to the example of FIG. 12.

Example 4

Figure 14:
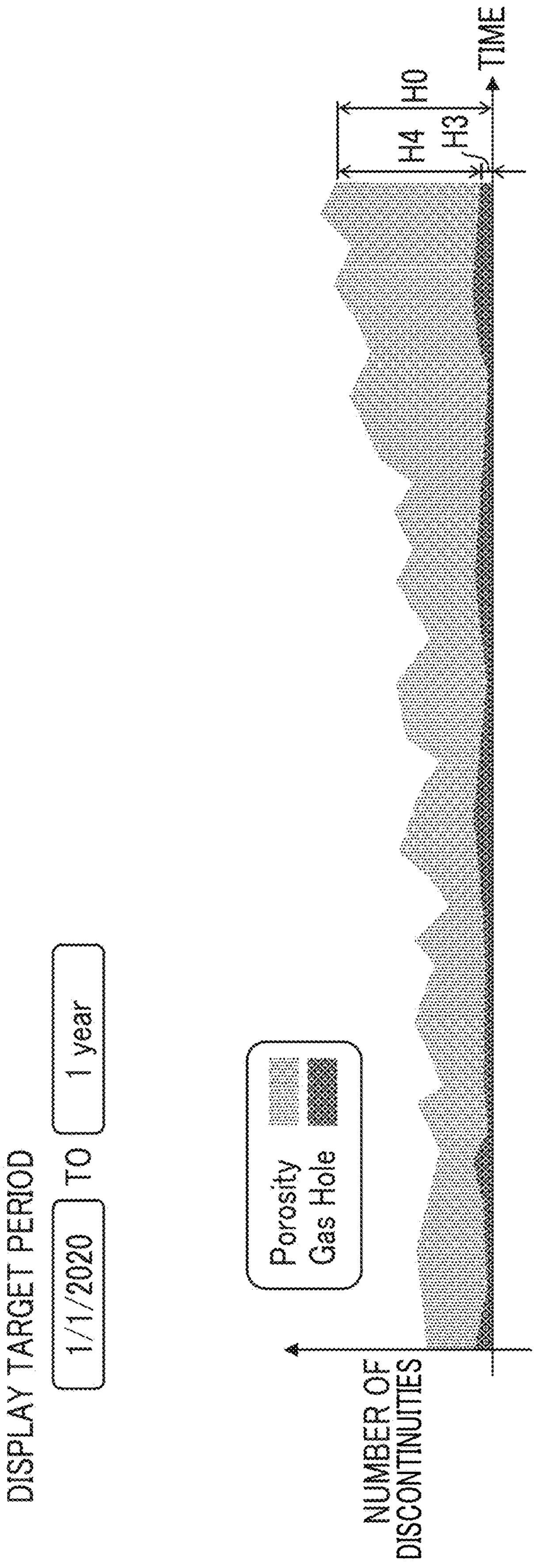
FIG. 14 is a diagram showing still another output example of the discontinuity information (an example of displaying a plurality of types of discontinuity information).

FIG. 14 is a diagram showing still another output example of the discontinuity information (an example of displaying a plurality of types of discontinuity information). In the example of FIG. 14, the processing unit 22 sets the display target period and the type of the discontinuity (here, the porosity and the gas hole) in accordance with the operation of the user via the operation unit 14, and the information extraction section 230 extracts the discontinuity information in accordance with the set condition. The output control section 232 displays a temporal change in the number of discontinuities (porosities and gas holes) in a graph on the display unit 18. In addition, the output control section 232 displays the graph (displays the graph by using different colors) in an identifiable manner according to the type of the discontinuity. Further, a height H3 indicates the number of gas holes, a height H4 indicates the number of porosities, and the height H0 indicates the total number of discontinuities.

Example 5

Figure 15:
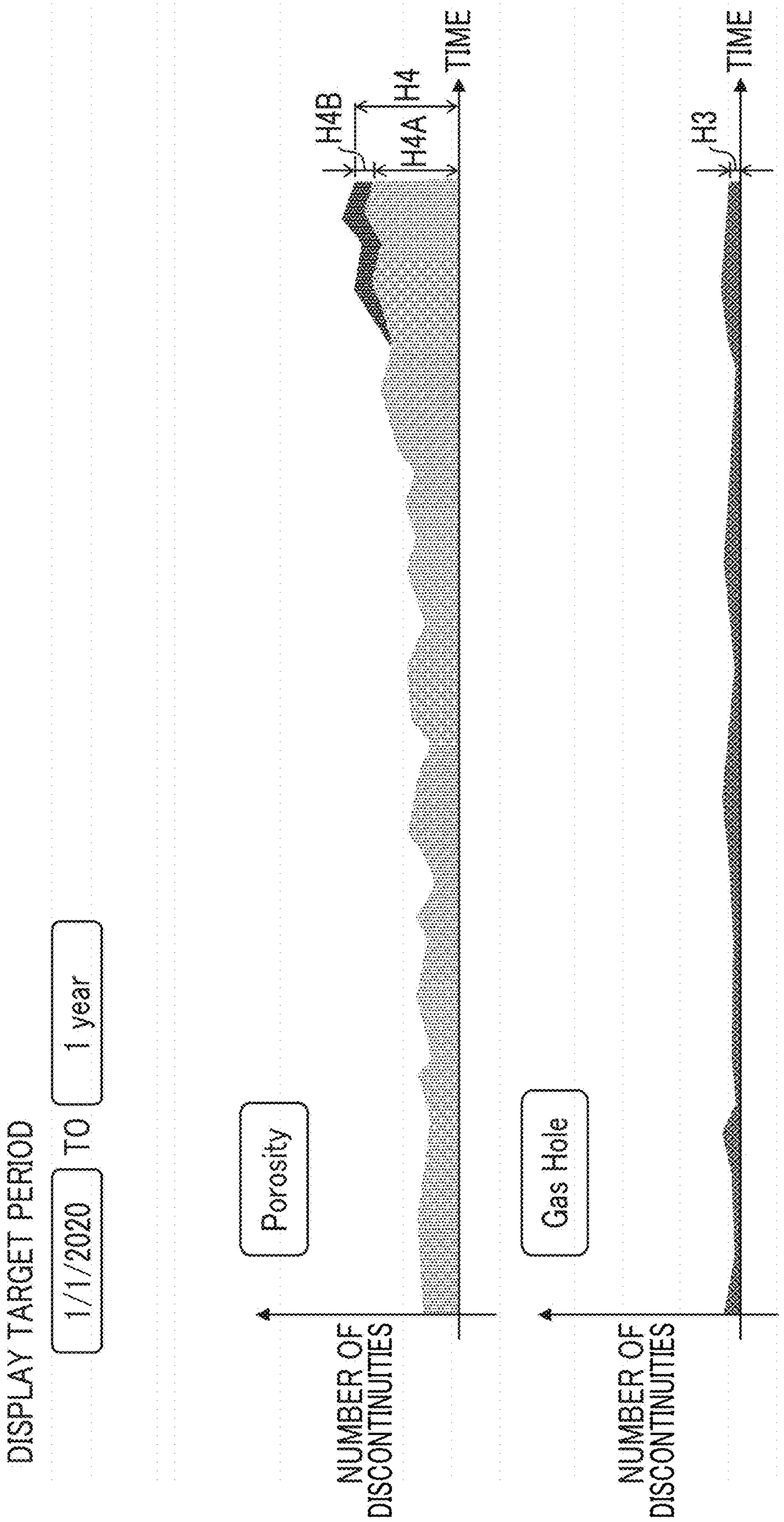
FIG. 15 is a diagram showing still another output example (display example) of the discontinuity information.

FIG. 15 is a diagram showing still another output example (display example) of the discontinuity information. In the example of FIG. 15, similar to FIG. 14, a plurality of types of the discontinuity information are displayed (a graph is drawn for each type of the discontinuity). In addition, in the example of FIG. 15, defects (here, a discontinuity (porosity) having a size exceeding the criterion value) are displayed in an identifiable manner. The height H3 indicates the number of gas holes, a height H4A indicates the number of porosities at a level that does not lead to the "defect", a height H4B indicates the number of porosities corresponding to the "defect", and the height H4 indicates the total number of porosities.

Example 6

Figure 16:
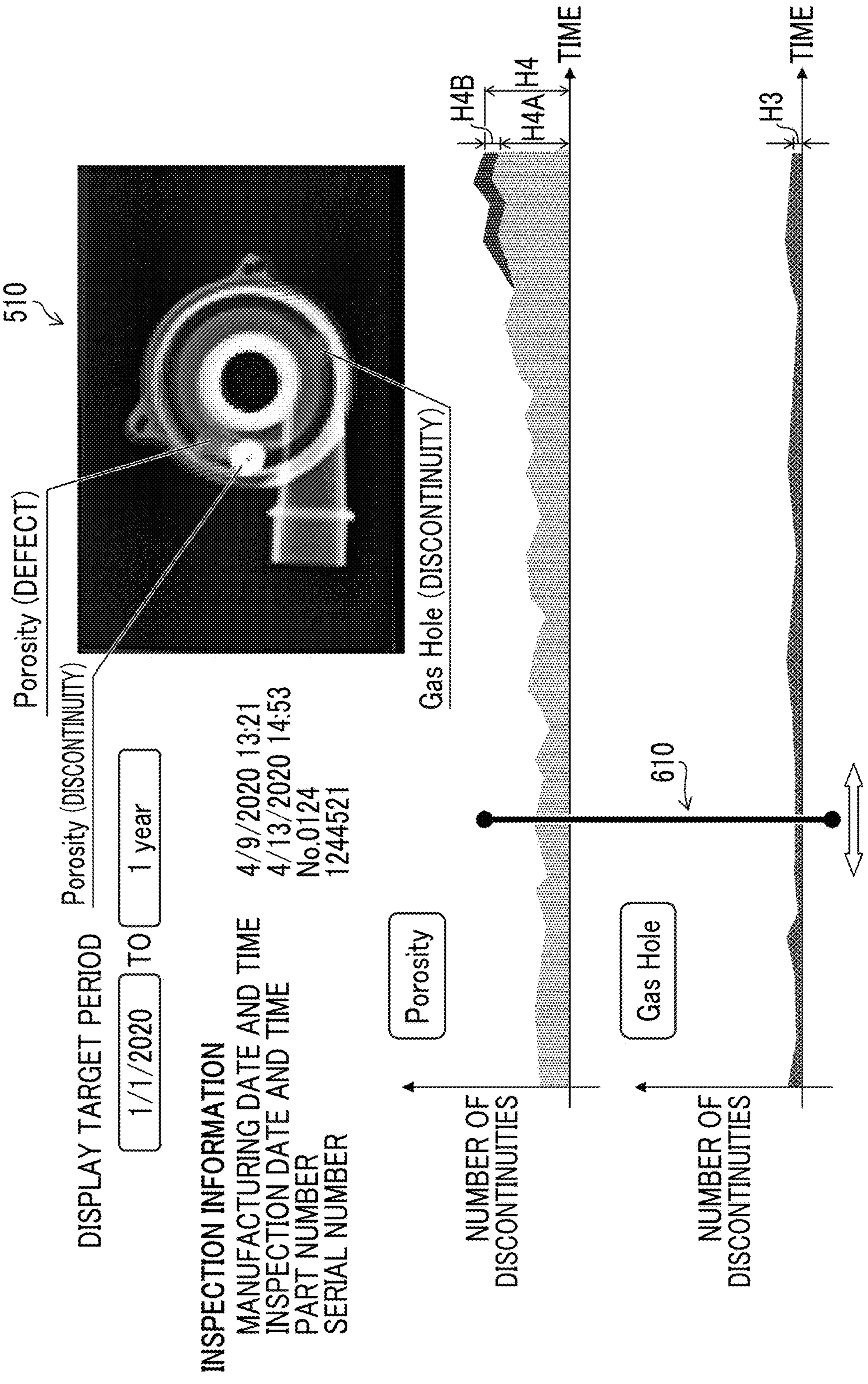
FIG. 16 is a diagram showing still another output example (display example) of the discontinuity information.

FIG. 16 is a diagram showing still another output example (display example) of the discontinuity information. In the example shown in FIG. 16, the output control section 232 displays the inspection information in addition to a display target period and the discontinuity information (the porosity and the gas hole). The output control section 232 can display the inspection information by referring to the inspection target object inspection result data D10 and the like shown in FIG. 6.

In the example shown in FIG. 16, a timeline bar 610 for designating time is displayed, and the user can operate the timeline bar 610 via the operation unit 14. The information extraction section 230 and the output control section 232 extract the discontinuity information at the set time indicated by the timeline bar 610, and superimpose and display the occurrence position (occurrence region) of the discontinuity on an image 510 of the inspection target object OBJ. The output control section 232 may superimpose and display the discontinuity information on a computer aided design (CAD) drawing or the like instead of the image.

In the example of FIG. 16, the porosity at the "discontinuity" level, the porosity at the "defect" level (at a level at which the inspection target object OBJ is deemed defective), and the gas hole at the "discontinuity" level are extracted and displayed. In such a superimposed display, it is also preferable that the output control section 232 displays the discontinuities in an identifiable manner according to the type or the degree (size or the like) of the discontinuity.

The processing unit 22 may, for example, automatically move the timeline bar 610 in a time axis direction in accordance with an information playback operation of the user and continuously change the superimposed display in accordance with the movement.

Effect of First Embodiment

As described above, with the inspection apparatus 10 (information processing apparatus), the information processing method, and the information processing program according to the first embodiment, it is possible to record useful discontinuity information of the subject.

Modification Example

The modification example of the first embodiment described above will be described below.

[Acquisition of Discontinuity Information Using Image Analyzer]

In the first embodiment, an aspect has been described in which the processing unit 22 acquires the discontinuity information through the image processing, but the discontinuity information may be acquired by using an image analyzer (learning model) that is constructed by using a machine learning algorithm and that analyzes the image of the subject. That is, the extraction section 220, the measurement section 222, and the classification section 224 among the functions of the processing unit 22 may be constructed by the image analyzer.

[Example of Layer Configuration of CNN]

Figure 17A:
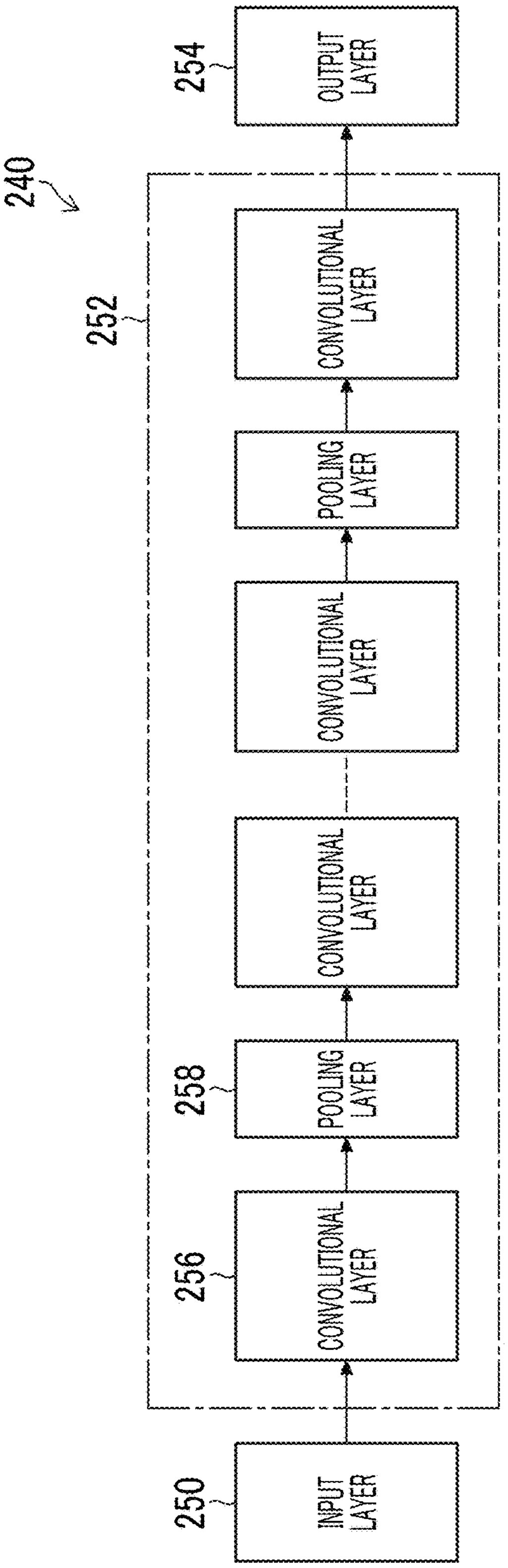
FIGS. 17A and 17B are diagrams showing examples of a layer configuration of a CNN.
Figure 17B:
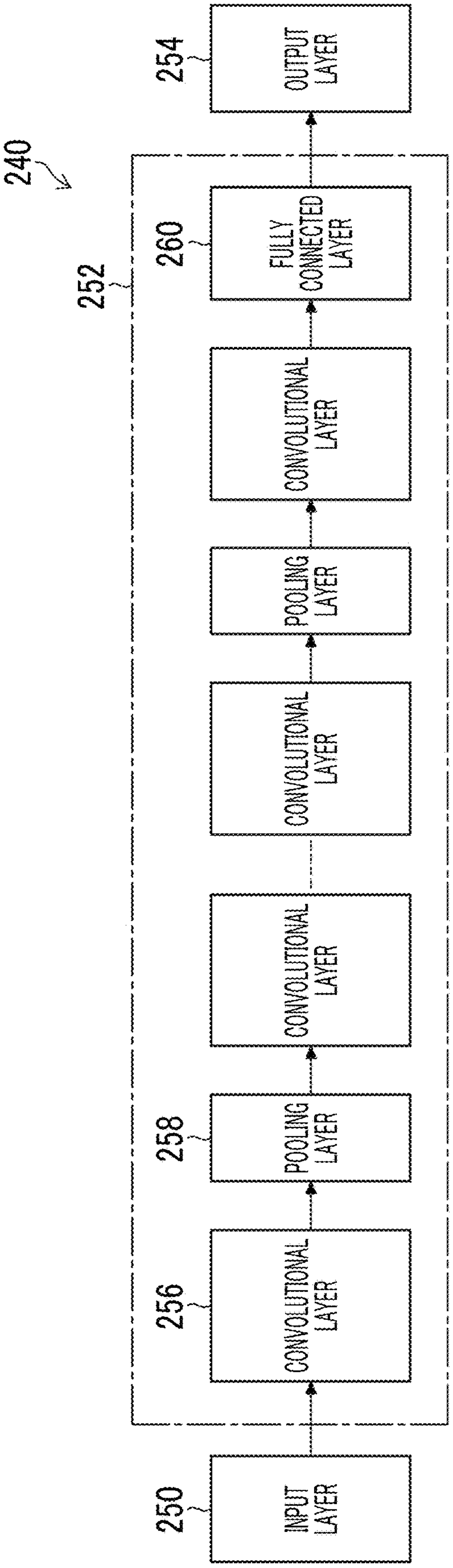

In the processing unit 22, an example of a layer configuration in a case where a convolutional neural network (CNN) is used as the image analyzer will be described. FIGS. 17A and 17B are diagrams showing examples of a layer configuration of a learning model 240 (image analyzer). In the example shown in FIG. 17A, the learning model 240 includes an input layer 250, an intermediate layer 252, and an output layer 254. The input layer 250 receives input of the image of the inspection target object OBJ and outputs a feature amount. The intermediate layer 252 includes a convolutional layer 256 and a pooling layer 258 and calculates another feature amount in response to input of the feature amount output from the input layer 250. These layers have a structure in which a plurality of "nodes" are connected by "edges" and hold a plurality of weight parameters. The values of the weight parameters change as the learning progresses. The learning model 240 may include a fully connected layer 260 as in the example shown in FIG. 17B. The layer configuration of the learning model 240 is not limited to a case where one convolutional layer 256 and one pooling layer 258 are repeated, and may include a plurality of continuous layers of any type (for example, the convolutional layer 256). In addition, a plurality of fully connected layers 260 may be continuously included.

[Processing in Intermediate Layer]

The intermediate layer 252 calculates a feature amount by a convolution operation and a pooling process. The convolution operation performed in the convolutional layer 256 is processing of acquiring a feature map through convolution operations using filters, and plays a role of feature extraction such as edge extraction from the image. Through the convolution operations using filters, a "feature map" of one channel (one sheet) is generated for one filter. The size of the "feature map" is downscaled by convolution and becomes smaller as convolution is performed at each layer. The pooling process performed in the pooling layer 258 is processing of reducing (or enlarging) the feature map output by the convolution operation to create a new feature map and plays a role of providing robustness such that the extracted features are not affected by parallel translation or the like. The intermediate layer 252 can be composed of one or a plurality of layers that perform these processes.

Figure 18:
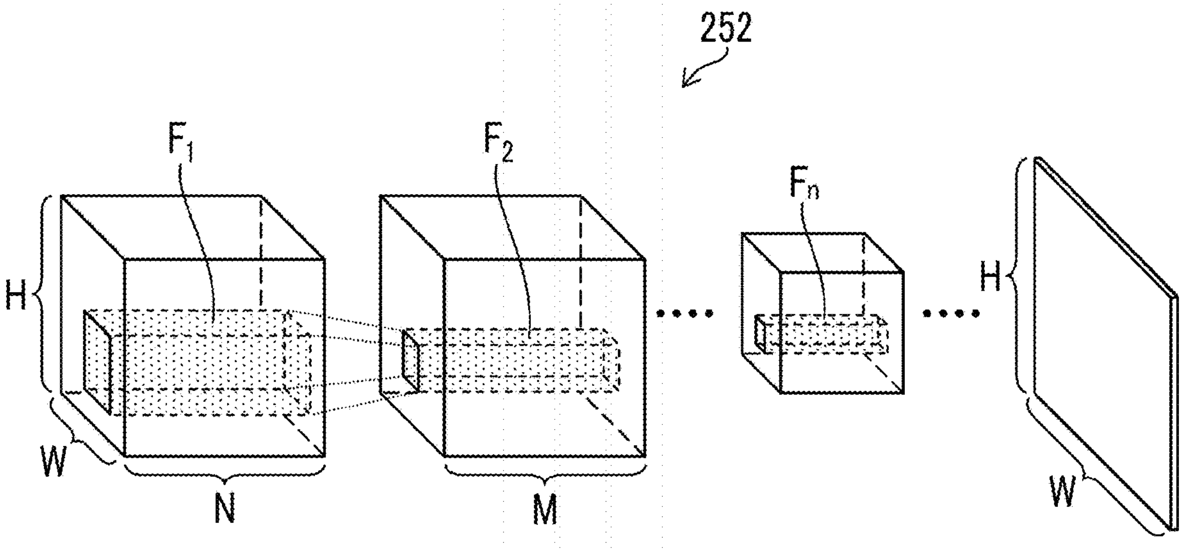
FIG. 18 is a diagram showing a state of processing by the CNN.

FIG. 18 is a diagram showing a state of the convolution operation in the learning model 240 shown in FIGS. 17A and 17B. In the first convolutional layer of the intermediate layer 252, the convolution operations between an image set (a learning image set during learning and a recognition image set during recognition such as detection) composed of a plurality of images and a filter $F_1$ are performed. The image set can be composed of N (N-channel) images having an image size of H in the vertical direction and W in the horizontal direction. In a case of inputting a visible light image, images constituting the image set are three-channel images, that is, red (R), green (G), and blue (B), and in a case of an infrared light image or a radiation image (radiation transmission image), the images are one-channel image (monochrome or grayscale). The filter $F_1$ used in the convolution operation with this image set is, for example, a filter having a filter size of 5×5×N in a case of a filter having a size 5 (5×5) because the image set has N channels (N images). Through the convolution operation using the filter $F_1$, a "feature map" of one channel (one sheet) is generated for one filter $F_1$. A filter $F_2$ used in the second convolutional layer has, for example, a filter size of 3×3×M in a case of a filter having a size 3 (3×3).

Similar to the first convolutional layer, in the second to n-th convolutional layers, convolution operations using filters $F_2$ to $F_n$ are performed. The reason why the size of the "feature map" in the n-th convolutional layer is smaller than the size of the "feature map" in the second convolutional layer is that the feature map is downscaled by the convolutional layer or the pooling layer up to the preceding stage.

Among the layers of the intermediate layer 252, in the convolutional layer closer to an input side, lower-order feature extraction (such as edge extraction) is performed, while higher-order feature extraction (extraction of features related to the shape, the structure, and the like of the object) is performed as it approaches an output side. In a case where the segmentation is performed for the purpose of measuring a region of interest (for example, the discontinuity), the region of interest is upscaled in the convolutional layer of the latter half portion, and the "feature map" having the same size as the input image set is obtained in the last convolutional layer. Meanwhile, in a case where the detection of the region of interest is performed, the upscaling is not essential because positional information need only be output.

The intermediate layer 252 may include a layer for performing batch normalization in addition to the convolutional layer 256 and the pooling layer 258. The batch normalization process is processing of normalizing the distribution of data in units of mini-batch during learning and plays a role of advancing learning quickly, reducing dependence on initial values, suppressing overtraining, and the like.

[Processing in Output Layer]

The output layer 254 is a layer that performs the position detection of the region of interest appearing in the input image (patch image or the like) based on the feature amount output from the intermediate layer 252 and that outputs the result. In a case of performing segmentation (class classification of the discontinuity or the like), the output layer 254 uses the "feature map" obtained from the intermediate layer 252 to understand the position of the region of interest appearing in the image at the pixel level. That is, it is possible to detect whether or not each pixel of the image belongs to the region of interest (whether or not it belongs to a specific class) and output the detection result. On the other hand, in a case of performing the object detection (detection of the discontinuity), it is not necessary to make a determination at the pixel level, and the output layer 254 outputs the positional information of the target object (discontinuity). In the present invention, various "discontinuities" can be considered to be a "specific class". The output layer 254 may finely classify and output the discontinuities (gas hole, porosity, foreign material less dense (FMLD), foreign material more dense (FMMD), fissuring, delamination, and the like).

The output layer 254 (learning model 240) can output the detection result (the result of the segmentation and the result of the class classification) for a unit region (each region in a case where the image of the inspection target object OBJ is divided into a plurality of regions). In addition, the output layer 254 can output the certainty (probability, reliability degree) of the detection result. The "unit region" may be composed of one pixel or a plurality of pixels. The learning model 240 may use a region obtained by dividing the image of the subject into a predetermined shape and size as the unit region.

The output layer 254 may execute the discrimination (classification) of the region of interest and output the discrimination result. For example, the output layer 254 may classify the image into two categories, that is, "normal" and "discontinuity", and may output two scores corresponding to "normal" and "discontinuity" as the discrimination result (the total of the two scores is 100% or 1) or output the classification result in a case where the classification can be clearly made from the two scores. The classification may be two classes or may be multi-class. For example, the output layer 254 may classify the image into three categories, that is, "normal", "discontinuity at a level that does not lead to the defect", and "discontinuity corresponding to the defect". In addition, the output layer 254 may classify the "discontinuity" into "discontinuity corresponding to the defect", "discontinuity to be focused on", and "other discontinuities".

In a case of outputting the discrimination result, the intermediate layer 252 or the output layer 254 may or may not include the fully connected layer as the last one layer or a plurality of layers (refer to FIG. 17B).

The output layer 254 may output a measurement result of the region of interest. In a case of performing the measurement, the measurement value of the region of interest to be measured can be directly output from the learning model 240. In addition, for example, as described above, segmentation is performed on the region of interest to be measured and then the measurement can be performed based on the result. In a case where the measurement value is directly output, it becomes a regression problem of the measurement value because the measurement value itself is trained for the image.

In a case of using the learning model 240 having the above-described configuration, it is preferable to, during the learning process, calculate the loss function (error function) by comparing the result output by the output layer 254 and the correct answer of recognition for the image set, and reduce (minimize) the loss function by performing processing (error backpropagation) of updating the weight parameter in the intermediate layer 252 from the layer on the output side toward the layer on the input side.

The learning model 240 after the learning end performs at least one of detection, classification, or measurement as the image analysis, and the processing unit 22 (processor) can acquire the discontinuity information based on the result of the analysis through the learning model 240.

[Correction of Analysis Result]

The processing unit 22 may correct the result of the analysis by the learning model 240 according to the operation of the user via the operation unit 14 or the like. This correction may be, for example, addition of the discontinuity information, deletion of unnecessary information, amendment of an error, grouping of information, or the like.

[Other Examples of Inspection Target Object (Subject)]

In the first embodiment, a case where the inspection target object (subject) is an industrial part or an industrial product has been described, but the inspection target object (subject) in the present invention is not limited to these articles. For example, structures or buildings (including a concrete structure) such as a bridge, a road, a tunnel, a building, or a dam can be used as subjects, and fissuring, delamination, or the like in these subjects can be treated as the discontinuity. In this case as well, the image may be a radiation image (or a radiation transmission image), a visible light image, or an infrared light image.

It should be noted that, in the modification example described above, the recording, extraction, display, and the like of the discontinuity information can be performed in the same manner as in the first embodiment, and useful discontinuity information of the subject can be recorded.

EXPLANATION OF REFERENCES

10: inspection apparatus
12: control unit
14: operation unit
16: I/F
18: display unit
20: buffer memory
22: processing unit
24: storage unit
100: imaging system
102: imaging control unit
104: imaging operation unit
106: image recording unit
108: camera
110: radiation source
112: radiation source
114: imaging room
200: product DB
220: extraction section
222: measurement section
224: classification section
226: condition calculation section
228: recording control section
230: information extraction section
232: output control section
240: learning model
250: input layer
252: intermediate layer
254: output layer
256: convolutional layer
258: pooling layer
260: fully connected layer
500: image
501: image
502: image
503: image
504: image
510: image
600: dropdown list
610: timeline bar
D10: inspection target object inspection result data
D100: inspection target object imaging data
D200: product data
$F_1$: filter
$F_2$: filter
H0: height
H1: height
H2: height
H3: height
H4: height
H4A: height
H4B: height
NW: network
OBJ: inspection target object

What is claimed is:

1. An information processing apparatus comprising:
a processor,
wherein the processor is configured to:
acquire first discontinuity information obtained by analyzing an image of a subject with a first criterion, the first discontinuity information including information indicating a feature of a discontinuity;
acquire second discontinuity information obtained by analyzing the image of the subject with a second criterion that is stricter than the first criterion, the second discontinuity information including information indicating the feature of the discontinuity; and
record the second discontinuity information in association with the first discontinuity information,
the processor is configured to calculate a recording condition based on the first discontinuity information, and acquire and/or record the second discontinuity information based on the recording condition,
the processor is configured to associate the first discontinuity information and the second discontinuity information with each other based on the recording condition, the first discontinuity information and the second discontinuity information include information related to an occurrence timing of the discontinuity, the processor is configured to acquire at least one of a manufacturing time, a manufacturing number, a lot number, an inspection time, an inspection number, or an image capturing time of the subject as the information related to the occurrence timing of the discontinuity, the processor is configured to record the second discontinuity information in association with information indicating a recording target period, and the processor is configured to extract information from the recorded information under a condition designated by an operation of a user and output the extracted information.

2. The information processing apparatus according to claim 1, wherein the first discontinuity information and the second discontinuity information each have information regarding an arrangement of a plurality of the subjects, and the processor is configured to associate the first discontinuity information and the second discontinuity information with each other based on the information regarding the arrangement.

3. The information processing apparatus according to claim 2, wherein the information regarding the arrangement has a component related to time.

4. The information processing apparatus according to claim 2, wherein the processor is configured to obtain a range of the first discontinuity information and/or the second discontinuity information to be recorded, based on the information regarding the arrangement.

5. The information processing apparatus according to claim 1, wherein the image is a radiation transmission image.

6. The information processing apparatus according to claim 1, wherein the first criterion is a criterion for at least one of a type, a number, a position in the subject, a size, a shape, a presence density, or a distance from another discontinuity of the discontinuity, and the processor is configured to perform the recording by using information indicating at least one of the type, the number, the position in the subject, the size, the shape, the presence density, or the distance from the other discontinuity of the discontinuity as the feature of the discontinuity.

7. The information processing apparatus according to claim 1, wherein the second criterion is a criterion for at least one of a type, a number, a position in the subject, a size, a shape, a presence density, or a distance from another discontinuity of the discontinuity, and the processor is configured to perform the recording by using information indicating at least one of the type, the number, the position in the subject, the size, the shape, the presence density, or the distance from the other discontinuity of the discontinuity as the feature of the discontinuity.

8. The information processing apparatus according to claim 1, wherein the processor is configured to acquire the second discontinuity information based on the second criterion for a discontinuity in the first discontinuity information and for a discontinuity that has a lower influence on quality and/or performance of the subject than the discontinuity in the first discontinuity information.

9. The information processing apparatus according to claim 1, wherein the processor is configured to perform the recording for a predetermined region in the subject.

10. The information processing apparatus according to claim 1, wherein the processor is configured to perform the recording for a period in which an occurrence frequency of the discontinuity is higher than a determination criterion value.

11. The information processing apparatus according to claim 1, wherein the processor is configured to perform the recording for a period in which an occurrence frequency of the discontinuity is equal to or lower than a determination criterion value.

12. The information processing apparatus according to claim 1, wherein the processor is configured to perform the recording for a period in which an occurrence frequency of the discontinuity falls within a determination criterion range.

13. The information processing apparatus according to claim 1, wherein the processor is configured to perform the recording for a first period in which the first discontinuity information is present.

14. The information processing apparatus according to claim 13, wherein the processor is configured to perform the recording for the first period and a second period preceding the first period.

15. The information processing apparatus according to claim 1, further comprising:

an image analyzer that is constructed by using a machine learning algorithm and performs the analysis on the image of the subject, wherein the processor is configured to acquire the first discontinuity information and/or the second discontinuity information by using the image analyzer.

16. The information processing apparatus according to claim 15, wherein the image analyzer performs one or more of detection, classification, and measurement as the analysis, and the processor is configured to acquire the first discontinuity information and/or the second discontinuity information based on a result of the analysis.

17. The information processing apparatus according to claim 15, wherein the processor is configured to correct a result of the analysis according to an operation of a user.

18. The information processing apparatus according to claim 1, wherein the processor is configured to output the recorded information and/or information extracted from the recorded information to a recording device and/or a display device.

19. The information processing apparatus according to claim 1, wherein the processor is configured to record the second discontinuity information in association with the first discontinuity information in such a manner that the second discontinuity information may be displayed in association with the first discontinuity information.

20. The information processing apparatus according to claim 1, wherein, in order to make the association, the processor is configured to record the first discontinuity information and the second discontinuity information on separate files with partially common file names, or store the first discontinuity information and the second discontinuity information in the same folder, or record the first discontinuity information and the second discontinuity information in the recording target period on a single file.

21. The information processing apparatus according to claim 1, wherein the processor is configured to cause the first discontinuity information and the second discontinuity information to be displayed for a designated type of discontinuity and for a designated region in the subject, in a designated period, in such a manner that the first discontinuity information and the second discontinuity information are identifiable.

22. An information processing method executed by an information processing apparatus including a processor, the information processing method comprising:

causing the processor to execute:

a first information acquisition step of acquiring first discontinuity information obtained by analyzing an image of a subject with a first criterion, the first discontinuity information including information indicating a feature of a discontinuity;

a second information acquisition step of acquiring second discontinuity information obtained by analyzing the image of the subject with a second criterion that is stricter than the first criterion, the second discontinuity information including information indicating the feature of the discontinuity; and a recording step of recording the second discontinuity information in association with the first discontinuity information, wherein the information processing method further causes the processor to execute calculating a recording condition based on the first discontinuity information, and acquiring and/or recording the second discontinuity information based on the recording condition, the information processing method further causes the processor to execute associating the first discontinuity information and the second discontinuity information with each other based on the recording condition, the first discontinuity information and the second discontinuity information include information related to an occurrence timing of the discontinuity, the information processing method further causes the processor to execute acquiring at least one of a manufacturing time, a manufacturing number, a lot number, an inspection time, an inspection number, or an image capturing time of the subject as the information related to the occurrence timing of the discontinuity, the information processing method further causes the processor to execute recording the second discontinuity information in association with information indicating a recording target period, and the information processing method further causes the processor to execute extracting information from the recorded information under a condition designated by an operation of a user and outputting the extracted information.

23. A non-transitory, computer-readable tangible recording medium which records thereon a program for causing, when read by a computer, a processor provided to the computer to execute the information processing method according to claim 22.

* * * * *